(12) United States Patent
Harb

(10) Patent No.: US 11,882,346 B2
(45) Date of Patent: Jan. 23, 2024

(54) SYSTEMS AND METHODS FOR IDENTIFYING WHETHER TO USE A TAILORED PLAYLIST

(71) Applicant: Rovi Guides, Inc., San Jose, CA (US)

(72) Inventor: Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 54 days.

(21) Appl. No.: 17/526,292

(22) Filed: Nov. 15, 2021

(65) Prior Publication Data

US 2022/0150604 A1    May 12, 2022

Related U.S. Application Data

(63) Continuation of application No. 16/618,061, filed as application No. PCT/US2017/035302 on May 31, 2017, now Pat. No. 11,206,463.

(51) Int. Cl.

| H04N 21/8549 | (2011.01) |
|---|---|
| G06F 16/738 | (2019.01) |
| H04N 21/431 | (2011.01) |
| H04N 21/432 | (2011.01) |
| H04N 21/466 | (2011.01) |

(52) U.S. Cl.
CPC ....... *H04N 21/8549* (2013.01); *G06F 16/739* (2019.01); *H04N 21/431* (2013.01); *H04N 21/432* (2013.01); *H04N 21/4665* (2013.01)

(58) Field of Classification Search
CPC ......... H04N 21/234363; H04N 21/251; H04N 21/41407; H04N 21/44218; H04N 21/816
See application file for complete search history.

(56) References Cited

U.S. PATENT DOCUMENTS

| 6,564,378 B1 | 5/2003 | Satterfield et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,863,162 B2 * | 10/2014 | Jagtiani ............. H04N 21/4756 725/13 |
| 9,826,285 B1 * | 11/2017 | Mishra ................... G06V 20/47 |
| 2002/0174430 A1 | 11/2002 | Ellis et al. |

(Continued)

OTHER PUBLICATIONS

PCT International Search Report for International Application No. PCT/US2017/035302, dated Oct. 20, 2017 (15 pages).

*Primary Examiner* — Michael H Hong
(74) *Attorney, Agent, or Firm* — HALEY GUILIANO LLP

(57) ABSTRACT

Systems and methods are provided herein for identifying a playlist of highlights to use for refreshing a user on a plot related to a media asset the user has requested to access based on how long it has been since the user last saw related programming. The media guidance application may receive a request from a user to access a media asset and may determine whether the user previously consumed a related media asset to the media asset. The media guidance application may determine whether a period of time between receiving the request and a time when the user previously consumed the related media asset exceeds a threshold period of time. If the period of time does not exceed the threshold, the media guidance application may play back a predefined playlist of highlights, and if it exceeds the threshold, the media guidance application may play back a customized playlist of highlights.

20 Claims, 6 Drawing Sheets

(56) References Cited

U.S. PATENT DOCUMENTS

| | | |
|---|---|---|
| 2005/0251827 A1 | 11/2005 | Ellis et al. |
| 2010/0153885 A1 | 6/2010 | Yates |
| 2013/0091140 A1 | 4/2013 | Attwell et al. |
| 2013/0174035 A1 | 7/2013 | Grab |
| 2013/0247081 A1* | 9/2013 | Vinson .................. H04N 21/254 |
| | | 725/14 |
| 2015/0249543 A1 | 9/2015 | Tang |
| 2015/0382069 A1* | 12/2015 | Pearlman ........... H04N 21/4821 |
| | | 725/46 |
| 2016/0014461 A1* | 1/2016 | Leech ............. H04N 21/44204 |
| | | 725/14 |
| 2016/0249116 A1 | 8/2016 | Harb |
| 2017/0280208 A1 | 9/2017 | Mishra et al. |
| 2018/0020243 A1 | 1/2018 | Ni et al. |

* cited by examiner

SYSTEMS AND METHODS FOR IDENTIFYING WHETHER TO USE A TAILORED PLAYLIST

CROSS-REFERENCE TO RELATED APPLICATIONS

This application is a continuation of U.S. patent application Ser. No. 16/618,061, filed Nov. 27, 2019, which is a national stage application under 35 U.S.C. § 371 of International Application PCT/US2017/035302, filed May 31, 2017, which are hereby incorporated by reference herein in their entireties.

BACKGROUND

Plot-driven programming that spans several episodes has become popular as of late in all forms of media. For example, many movies now have prequels and sequels, and many television series have multiple seasons of episodes. The related art describes various ways of refreshing a user's recollection of what happened earlier in the sequence of plot-driven programming. Often, prior to the user consuming new media, stock video clips of related programming are played to refresh the user's recollection of previous plots. The related art does not account for the recency in which the user viewed the related programming and indiscriminately updates a user the same way whether he watched the last episode days, weeks, months or years ago.

SUMMARY

Systems and methods are described herein for identifying a playlist of highlights to use for refreshing a user on a plot related to a media asset the user has requested to access based on how long it has been since the user last saw related programming. For example, if a user has requested to watch "The Red Woman," the first episode in season six of the television series "Game of Thrones," a playlist of highlights may be identified and played prior to starting "The Red Woman" episode based the amount of time between the user's request and when the user last watched Game of Thrones. If the user last watched Game of Thrones a year ago, the playlist of highlights may be chosen based on clips of plot lines in all previous five seasons because of the long gap of time between viewings. Thus, the systems and methods provided herein may ensure that the user is adequately refreshed on the plot of the media asset the user-requested to access.

To this end and others, in some aspects of the disclosure, a media guidance application may receive a request from a user to access a media asset. For example, the media guidance application may receive a selection from the user of a listing corresponding to season six episode one of "Game of Thrones."

In response to receiving the request, the media guidance application may retrieve, from a database, information from a profile corresponding to the user. For example, the media guidance application may retrieve time stamp data from the database corresponding to all the dates and times the user watched content.

The media guidance may determine, based on the information from the profile, whether a related media asset to the media asset was previously consumed by the user. For example, the media guidance application may determine from the time stamp data if the user previously watched any other episodes of "Game of Thrones" in the past.

In some embodiments, when the media guidance application is determining whether the related media asset was previously consumed by the user, the media guidance application may retrieve, from the information, a plurality of media asset identifiers corresponding to media assets that were previously consumed by the user. For example, in response to determining that the user previously watched season five episode ten of "Game of Thrones," the media guidance application may retrieve the episode's title, season, etc.

The media guidance application may compare metadata of the related media asset to metadata corresponding to each media asset identifier of the plurality of media asset identifiers, and may determine, based on comparing the metadata of the related media asset to the metadata corresponding to each media asset identifier of the plurality of media asset identifiers, whether the metadata of the related media asset matches metadata of a media asset identifier of the plurality of media asset identifiers. For example, the media guidance application may compare metadata that includes the specific episode title (e.g., "The Red Woman"), season (e.g., six), television series (e.g., "Game of Thrones") of season six episode one of "Game of Thrones" to the metadata of season five episode ten of "Game of Thrones" (e.g., episode title: "Mother's Mercy," season: six, television series: "Game of Thrones"). The media guidance application may determine that the metadata of season six episode one of "Game of Thrones" matches metadata of season five episode ten of "Game of Thrones" because the "television series" metadata in both episodes is the same (e.g., both are "Game of Thrones").

In response to determining that the metadata of the related media asset matches the metadata of the media asset identifier of the plurality of media asset identifiers, the media guidance application may determine that the related media asset was previously consumed by the user. For example, the media guidance application may retrieve a time stamp entry from the database corresponding to a related episode of "Game of Thrones." The media guidance application may determine from the entry in the time stamp data (e.g., GameofThrones|S5E10|6/14/2015|10:00-10:45 PM) that the user previously watched season five episode ten of "Game of Thrones." The media guidance application may make this determination by looking at the "time watched" component of the time stamp entry (e.g., 10:00-10:45 PM) to determine that the user viewed a sufficient amount of the episode (e.g., at least 75%).

In some embodiments, when the media guidance application is determining whether the related media asset was previously consumed by the user, the media guidance application may retrieve, from the information, an amount of time that the related media asset was consumed by the user. For example, the media guidance application may retrieve from the time stamp data that the user watched season six episode one of "Game of Thrones" for forty-five minutes.

The media guidance application may retrieve, from the information, a total runtime of the related media asset and may compare the amount of time that the user spent consuming the related media asset to the total runtime of the related media asset. For example, the media guidance application may retrieve from the "episode length" metadata that the runtime for season six episode one of "Game of Thrones" was fifty minutes. If the user watched forty-five minutes of season six episode one of "Game of Thrones," the media guidance application may compare the forty-five minutes of viewed time to the fifty-minute runtime.

The media guidance application may determine, from the comparison, a percentage of the related media asset that the user consumed. The media guidance application may determine whether the percentage exceeds a threshold percentage. For example, if the user viewed forty-five minutes out of a fifty minute episode of "Game of Thrones," the media guidance application may determine that the user consumed 90% of the episode. The media guidance application may then compare the 90% consumption with a threshold percentage (e.g., 50%).

In response to determining that the percentage exceeds the threshold percentage, the media guidance application may determine that the related media asset was previously consumed. If the media guidance application determines that the user consumed more of the episode than the threshold percentage, then the media guidance application may determine that the episode was previously consumed by the user. For example, if the user viewed 90% of season six episode one of "Game of Thrones," and the threshold to be considered watched is 50%, the media guidance application may determine that the user watched season six episode one of "Game of Thrones."

In response to determining that the related media asset was previously consumed, the media guidance application may determine, from the information, a time at which the related media asset was previously consumed. For example, the media guidance application may determine from the time stamp data that the user watch season five episode ten of "Game of Thrones" on Jun. 14, 2015 at 10:00 PM.

The media guidance application may determine a period of time between receiving the request and the time at which the related media asset was consumed. For example, if the user watched season five episode ten of "Game of Thrones" on Jun. 14, 2015 and requested to watch season six episode 1 of "Game of Thrones" on Apr. 24, 2016, the media guidance application may determine the period of time between watching the two episodes is 315 days.

The media guidance application may determine whether the period of time exceeds a threshold period of time. For example, if the threshold period of time is 90 days, the media guidance application may determine that the period of time between watching two episodes of "Game of Thrones" (e.g., 315 days) exceeds the threshold.

In response to determining that the period of time does not exceed the threshold, the media guidance application may play back a predefined playlist of highlights, where the highlights comprise a predetermined scene from the related media asset. For example, if the user wants to watch season six episode ten of Game of Thrones and watched the season six episode nine of "Game of Thrones" seven days prior to watching episode ten, if the threshold period of time is thirty days, the media guidance application may determine that the seven-day period of time does not exceed the threshold of thirty days. The media guidance application may then play a predefined playlist of highlight clips that briefly recapitulates what happened at the end of the episode nine.

In some embodiments, when the media guidance application is playing back a predefined playlist of highlights, the media guidance application may retrieve, from the information, a plurality of candidate-predefined playlists. For example, the media guidance application may retrieve default playlists generated created by the makers of the media content (e.g., the editors for "Game of Thrones" would create generic recapitulation clips for play before each episode).

The media guidance application may determine, from the information, the preferred attributes of the user. For example, the media guidance application may determine that the user's preferred attributes related to "Game of Thrones" are specific plots (e.g., Cersei Lannister's (a character in "Game of Thrones") revenge against the Faith)), preferred characters (e.g., the "Game of Thrones" characters Arya Stark, Cersei Lannister, Brienne of Tarth), preferred actors (e.g., the "Game of Thrones" actors Lena Headey, Emilia Clarke, Peter Dinklage, etc.), and a preferred recap length (e.g., thirty seconds, two minutes, etc.).

The media guidance application may compare attributes of each of the candidate-predefined playlists to the preferred attributes. For example, the media guidance application may compare the featured plots of each of the "Game of Thrones" predefined playlists to the user's preference for plots about Cersei Lannister (a character in "Game of Thrones").

The media guidance application may rank each of the candidate-predefined playlists based on the comparing of the attributes of each of the candidate-predefined playlists to the preferred attributes and may determine the candidate-predefined playlist with the highest rank. For example, the media guidance application may determine that the user loves the character of Cersei Lannister in "Game of Thrones." The media guidance application may compare the attributes of the candidate "Game of Thrones" playlists with the attribute of the user preferring Cersei Lannister, and may rank the candidate playlists based on how featured Cersei Lannister is in each playlist (e.g., candidate playlists featuring Cersei Lannister would be ranked higher than candidates playlists that do not feature Cersei Lannister).

The media guidance application may then play back the candidate-predefined playlist with the highest rank. For example, if the playlists are ranked based on how much Cersei Lannister is featured in each playlist, the media guidance application may determine that the playlist where Cersei Lannister is featured the most (e.g., she has the most screen time) may be played back.

In response to determining that the period of time exceeds the threshold, the media guidance application may generate a customized playlist of highlights. For example, if the user wants to watch season six episode ten of Game of Thrones and watched the season six episode nine of "Game of Thrones" ninety days prior to watching episode ten, if the threshold period of time is thirty days, the media guidance application may determine that the ninety-day period of time exceeds the threshold of thirty days. The media guidance application may then generate a customized playlist of highlight clips.

The media guidance application may retrieve, from the database, candidate highlights from a plurality of media assets, where the plurality of media assets comprises the related media asset. For example, the media guidance application may retrieve clips from "Game of Thrones" episodes throughout all six seasons of the television series.

The media guidance application may determine, based on the information from the profile, preferred attributes of the user (e.g., the preferred attributes of the user may be preferred plots, preferred actors, preferred characters, etc.).

In some embodiments, when the media guidance application is determining the preferred attributes of the user, the media guidance application may retrieve, from the information, preferences for the user (e.g., preferred plots, preferred actors, preferred characters, etc.).

The media guidance application may determine, from the preferences for the user, preferred attribute criteria for the user. For example, the media guidance application may determine from user preferences (e.g., preferred plots, preferred actors, preferred characters, etc.) that the preferred attribute criteria requires that the total runtime of the playlist of customized highlights is no longer than ninety seconds, and/or that at least three of the user's preferred actors appear in the candidate highlight (e.g., Cersei Lannister, Arya Stark, and Brienne of Tarth appear in the candidate highlight).

The media guidance may retrieve, from the database, metadata for the media asset (e.g., tags, description, title, season, etc.).

The media guidance application may determine, from the metadata, metadata attributes. For example, the media guidance application may determine that the metadata attributes may be certain titles, descriptions, characters, and/or actors.

The media guidance application may select the metadata attributes to be candidate-preferred attributes. For example, the media guidance application may select the metadata attribute "description" and "characters" to be candidate-preferred attributes.

The media guidance application may compare the candidate-preferred attributes to the preferred attribute criteria. For example, the media guidance application may compare the candidate-preferred attributes (e.g., the description and the characters) to the preferred attribute criteria (e.g., at least three of the user's preferred actors are present in the candidate highlight).

The media guidance application may determine, from the comparison, a subset of candidate-preferred attributes that meet the preferred attribute criteria. For example, the media guidance application may determine that the "characters" metadata attribute (e.g., which may contain the "Game of Thrones" characters Jamie Lannister, Cersei Lannister, Arya Stark, The Hound, and Brienne of Tarth) meets the preferred attribute criteria (e.g., at least three of the user's preferred actors are present in the candidate highlight).

The media guidance application may select a portion of the subset of candidate-preferred attributes to be the preferred attributes. The media guidance application may select the "characters" candidate-preferred attribute to be the preferred attributes.

In some embodiments, when the media guidance application is determining the preferred attributes of the user, the media guidance application may retrieve, from a social media profile corresponding to the user, social media data for the user. For example, the media guidance application may retrieve the user's data from the user's Facebook, Twitter, Instagram, and/or SnapChat profiles.

The media guidance application may determine, from the social media data, social media attributes for the user. For example, the media guidance application may determine from the user's Twitter profile that the user's favorite character in "Game of Thrones" is Cersei Lannister based on the user's tweets.

The media guidance application may combine the metadata attributes and the social media attributes to form the candidate-preferred attributes. For example, the media guidance application may combine the metadata attributes (e.g., certain titles, descriptions, characters, and/or actors) with the social media attributes (e.g., the user's preferred characters as determined by the user's Twitter profile).

The media guidance application may compare attributes of each of the candidate highlights to the preferred attributes. For example, the user may prefer the "Game of Thrones" character Cersei Lannister, and the media guidance application may compare this preference to the candidate highlight clips.

The media guidance application may rank each of the candidate highlights based on the comparing of the attributes of each of the candidate highlights to the preferred attributes. For example, the media guidance application may rank the highlight clips based on how much the clips feature Cersei Lannister.

In some embodiments, when the media guidance application is ranking each of the candidate highlights, the media guidance application may retrieve, from the information, preferences for the user. For example, the media guidance application may retrieve the user's preferred actors, preferred plots, preferred characters, etc.

The media guidance application may determine a preferred attribute based on the preferences for the user, where the preferred attribute corresponds to at least one of the preferences. For example, the media guidance application may determine that the user's preferred characters (e.g., Cersei Lannister, Arya Stark, etc.) are a preferred attribute.

The media guidance application may compare the attributes of the candidate highlights to the preferred attribute. For example, the media guidance application may compare the attributes of the candidate highlights (e.g., the characters, plots, actors, etc. in the highlight clips) with the preferred attribute (e.g., the user's preferred characters).

The media guidance application may rank the candidate highlights based on the results of the comparison. For example, the media guidance application may rank candidate highlights that feature the "Game of Thrones" characters Cersei Lannister and Arya Stark (the user's preferred characters) higher than candidate highlights where Cersei Lannister and Arya Stark are not featured in.

In some embodiments, when the media guidance application is ranking each of the candidate highlights, and where the preferences for the user are original preferences for the user, the media guidance application may initialize a counter to zero. For example, the original preferences may be that the user prefers the "Game of Thrones" characters Cersei Lannister and Arya Stark. The media guidance application may initialize an integer counter to zero.

The media guidance application may periodically determine, during a plurality of periods, whether the original preferences of the user have changed. For example, the media guidance may determine every three days whether the preferences of the user have changed.

During each period of the plurality of periods, the media guidance application may retrieve, from the information, updated preferences of the user. For example, the media guidance application may retrieve the user's updated preferences, which may include that the user prefers the "Game of Thrones" characters Jamie Lannister and John Snow.

The media guidance may determine whether the updated preferences of the user are different from the original preferences of the user. For example, the media guidance application may determine the updated preferences of the user are different because the user now prefers the "Game of Thrones" characters Jamie Lannister and John Snow, when the user originally preferred the "Game of Thrones" characters Cersei Lannister and Arya Stark.

In response to determining that the updated preferences for the user are different, the media guidance application may add a value to a counter. For example, the media guidance application may add an integer (e.g., one) to the counter (e.g., which would change from zero to one).

In response to determining that the updated preferences for the user are not different, the media guidance application may reset the counter to zero. For example, if the user's preferences did not change (e.g., the user's preferred "Game of Thrones" characters stayed the same), the media guidance application may reset the counter to zero (e.g., reset the counter from five to zero).

The media guidance application may determine whether the counter exceeds an update threshold. For example, if the update threshold is five (e.g., five periods in a row of having different preferences), the media guidance application may determine that the counter exceeds the threshold (e.g., the counter's value is six).

In response to determining that the counter exceeds the update threshold, the media guidance application may set the original preferences of the user to be the updated preferences of the user, and update the preferred attribute based on the updated preferences of the user, where the preferred attribute corresponds to at least one of the updated preferences. For example, in response to determining that the counter exceeds the update threshold, the media guidance application may set the original preferences to be the updated preferences (e.g., set the user's preferred characters to be Jamie Lannister and John Snow). The media guidance application may update the preferred attribute (e.g., the preferred attribute is the user's preferred characters) to be the user's preferred "Game of Thrones" characters Jamie Lannister and John Snow.

The media guidance application may add each candidate highlight based on the ranking to the customized playlist of highlights until a time parameter is reached. For example, the media guidance application may add the top ranked highlight clips that feature Cersei Lannister until a time parameter is reached (e.g., the time parameter may be 30 seconds, 2 minutes, 5 minutes, etc.).

The media guidance application may play back the customized playlist of highlights. For example, the media guidance application may play back a three-minute playlist of highlight clips that features Cersei Lannister.

In some embodiments, when the media guidance application is generating the customized playlist of highlights, the media guidance application may retrieve, from the information, information comprising a chronological data set of times at which each of a plurality of media assets related to the media asset were previously consumed, where the plurality of media assets related to the media asset comprises the related media asset. For example, the media guidance application may determine from the time stamp data that the user watched "Game of Thrones" on May 1, 2016, May 8, 2016, and May 15, 2016.

The media guidance application may determine, from the data set of times, an interval of time between two consecutive time data points in the data set of times (e.g., a seven-day interval of time between watching "Game of Thrones" on May 1, 2016 and May 8, 2016).

The media guidance application may determine whether the interval of time exceeds a threshold interval of time during which the user did not consume related media content (e.g., the threshold may be 24 hours, 7 days, 30 days, 90 days, etc.).

In response to determining that the interval of time exceeds the threshold interval of time, the media guidance application may select highlights from a related media asset consumed directly before the interval in time and add the selected highlights to the customized playlist of highlights. For example, the media guidance application may determine that the user last watched "Game of Thrones" (e.g. season six episode 10) on Jun. 26, 2016. The media guidance application may determine that the interval of time between the request of the user to watch "Game of Thrones" and the last time the user watched "Game of Thrones" (Jun. 26, 2016) was one hundred days. The media guidance application may determine that this interval of time exceeds the threshold interval (e.g., the threshold interval may be 90 days). The media guidance application may then choose highlight clips from the "Game of Thrones" episode (e.g., season six episode 10) the user watched on Jun. 26, 2016 to add to the customized playlist of highlights.

In some embodiments, when the media guidance application is generating the customized playlist of highlights, the media guidance application may retrieve, from the database, highlights from a plurality of media assets, where the plurality of media assets comprises the related media asset. For example, the media guidance application may retrieve highlight clips from numerous different episodes of "Game of Thrones."

The media guidance application may compare metadata of the highlights to predefined metadata criteria, where the predefined metadata criteria is found in the profile. For example, the metadata criteria may require that the metadata of the highlight clips contain certain titles, descriptions, characters, and/or actors.

The media guidance application may determine whether the metadata for each of the highlights meets the predefined metadata criteria. For example, if the metadata criteria require that the highlight clips metadata contain the season "season six" and the "Game of Thrones" character "Jamie Lannister," the media guidance application may determine which highlight clips meet these criteria.

In response to determining that a highlight meets the predefined metadata criteria, the media guidance application may determine that the highlight is a candidate highlight. For example, if one of the predefined metadata criteria is a metadata description that contains the phrase "Cersei Lannister," the media guidance application may determine that a highlight that has a metadata description that contains the phrase "Cersei Lannister" is a candidate highlight.

DETAILED DESCRIPTION

Figure 1:
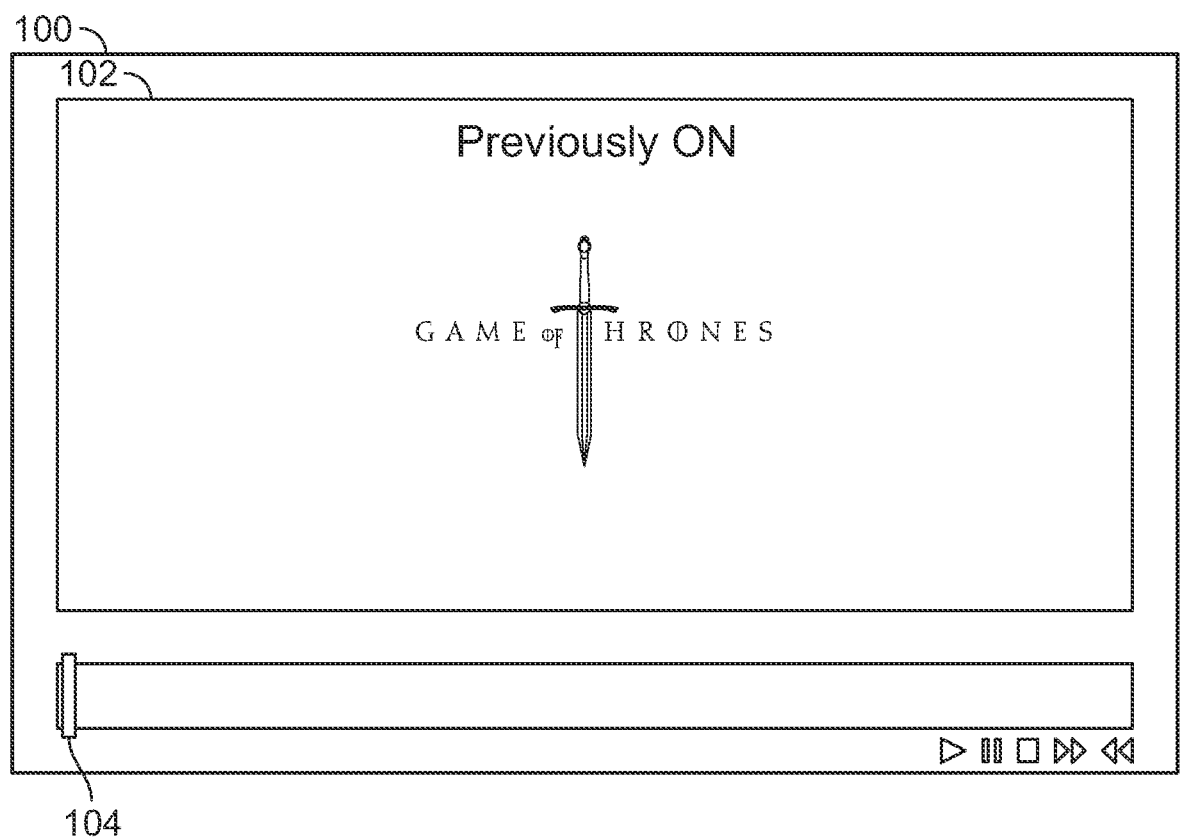
FIG. 1 depicts an illustrative embodiment of a display screen of user equipment that is playing back a playlist of highlights, in accordance with some embodiments of the disclosure.

FIG. 1 depicts an illustrative embodiment of a display screen of user equipment that is playing a playlist of highlights, in accordance with some embodiments of the disclosure. As referred to herein, the term "highlight" is defined to mean a portion of an electronically consumable user asset of particular significance, such as a video clip, audio, picture, and any other media or multimedia or combination of the same. An electronically consumable user asset of a particular significance may be defined by a profile, may be defined by an editor, may correspond to a particular event or occurrence, etc. For example, a highlight may be defined by an editor to be a video clip of an important scene in a television series, as determined by the editor, that gives the audience new insight into the main plot of the series. As another example, the highlight may be a video clip of a particular event (e.g., a battle scene in "Game of Thrones") in a television series (e.g., such as "Game of Thrones"). FIG. 1 depicts an illustrative display 100, which may be presented by control circuitry that executes a media guidance application on any user equipment. The functionality of user equipment, control circuitry, and the media guidance application is described in further detail with respect to FIGS. 2-5.

The media guidance application may generate for display recapitulation 102, which may occur when a media asset corresponding to recapitulation 102 is selected. As an illustrative example, recapitulation 102 may be a playlist of highlights related to the television series "Game of Thrones," which is a fantasy drama television series set in multiple fictional continents that involves several plot lines and a large ensemble cast. The media guidance application may generate progress bar 104 that corresponds to a viewer's current progress point in recapitulation 102.

In some embodiments, a media guidance application may receive a request from a user to access a media asset. For example, the media guidance application may receive a selection from the user of a listing corresponding to season six episode one of "Game of Thrones." As another example, the media guidance application may receive a selection from the user of previously recorded content corresponding to season one episode one of "Game of Thrones." Manners in which the media guidance application may receive a request from a user to access a media asset, whether a linear, scheduled media asset or a non-linear media asset, are further discussed below with respect to FIGS. 2-5.

In response to receiving the request, the media guidance application may retrieve, from a database, information from a profile corresponding to the user. Manners in which the media guidance application may retrieve information from the database are further discussed below with respect to FIGS. 2-5.

The media guidance application may determine, based on the information from the profile, whether a related media asset to the media asset was previously consumed by the user. As defined herein, a "related media asset" is defined to mean a media asset that shares at least a threshold amount of attributes with the media asset the user-requested to access. Manners in which the media guidance application retrieves and/or determines the threshold amount of attributes are described in further detail below. The media guidance application may retrieve viewing history data from the information in the profile, to determine if a related media asset was previously consumed. As described herein, "viewing history data" is defined to mean a data indicative of media assets that have been consumed by the user. The media guidance application may add a media asset to the viewing history data during viewing, or after the user views said media asset. The media guidance application may determine, based on the methods described below, if a related media asset to the media asset was previously consumed. For example, if the user-requested to access season six episode one of the television series "Game of Thrones," the media guidance application may retrieve the viewing history data from the user profile in the database. The media guidance application may determine, based on the methods described below, whether the user previously watched any related media assets (e.g., any other episodes of "Game of Thrones").

In some embodiments, the media guidance application may determine if a media asset is related to the user-requested media asset by determining potentially related media assets and then comparing the potentially related media assets to the user-requested media asset to determine any actually related media assets. The media guidance application may use metadata when comparing the media assets, as described in more detail below.

The media guidance application may determine potentially related media assets by retrieving, from the profile, the media assets from the viewing history data corresponding to previously consumed media assets by the user, and setting these previously consumed media assets to be the potentially related media assets. For example, the media guidance application may retrieve, from the profile, a list of previously consumed media assets by the user (e.g., Game of Thrones: The Red Woman; The Office: The Injury; 30 Rock: Queen of Jordan) corresponding to the television series name and episode title. The media guidance application may retrieve, from the guidance data, media asset identifiers for the potentially related media assets and media asset identifiers for the user-requested media asset. For example, if the media guidance application is determining whether the user previously consumed a related media asset to season six episode one of "Game of Thrones," the media guidance application may retrieve the previously consumed media assets from the user viewing history data in the profile (e.g., which are the potentially related media assets). The media guidance application may retrieve media asset identifiers from the guidance data, (e.g., television series, episode title, season, runtime, genre, release date, etc.) for media assets that were previously consumed by the user. Manners in which the media guidance application may retrieve media asset identifiers from the guidance data are further discussed below with respect to FIGS. 2-5.

The media guidance application may also retrieve, from the guidance data, metadata corresponding to the media asset identifiers for the potentially related media assets and metadata corresponding to the media asset identifiers for the user-requested media asset. For example, the media guidance application may retrieve, from the guidance data, metadata corresponding to the media asset identifiers (e.g., television series: Game of Thrones; episode title: The Red Woman; season: six; runtime: fifty minutes, genre: fantasy; release date: Apr. 24, 2016). Manners in which the media guidance application may retrieve metadata from the guidance data are further discussed below with respect to FIGS. 2-5.

In some embodiments, the media guidance application may determine if a media asset is related to the user-requested media asset by comparing metadata of the potentially related media assets to the requested media asset. The media guidance application may retrieve the metadata of the potentially related media assets and the requested media asset from the guidance data. The media guidance application may retrieve metadata related to the content of the media assets (e.g., television series, episode title, characters, etc.).

The media guidance application may compare the metadata to determine if there are any matches between the two sets. As described herein, the media guidance application determines that there is a "match" when two pieces of data (e.g., metadata) from two distinctly different media assets are the same. For example, if the media guidance application is comparing television series metadata for two distinctly different media assets (e.g., television series: Game of Thrones; episode: The Red Woman) and (e.g., television series: Game of Thrones; episode: The Winds of Winter), the media guidance application may determine that the "television series" metadata is a match. In response to determining that there is at least one match between the two sets of metadata, the media guidance application may determine from the match/matches if the match/matches exceed a threshold amount of matched metadata. The media guidance application may weight the metadata matches when determining if the matches exceed a threshold amount. The media guidance application may weigh metadata with "title" or "series" indicators much higher than other types of metadata (e.g., "title" and "series" indicators weighted high, all other indicators weighted low). To exceed the threshold, the media guidance application may determine that only a "title" or "series" match is needed. If the media guidance application determines that there is not a "title" or series" match, the media guidance application may require multiple metadata matches (corresponding to lower weighted metadata) to exceed the threshold. The term "threshold amount of matched metadata" may also be referred to as the "threshold amount of attributes." If the media guidance application determines that the threshold is exceeded, the media guidance application may determine that the potentially related media asset corresponding to said match is related to the requested media asset.

For example, the media guidance application may retrieve, from the viewing history data, previously viewed media assets by the user (e.g., potentially related media assets), which may be season five episode ten of "Game of Thrones." The media guidance application may determine if this previously viewed episode is related to the user's requested media asset, season six episode one of "Game of Thrones."

The media guidance application may retrieve, from the guidance data, media asset identifiers (e.g., television series title, season, episode title, etc.) for season five episode ten of "Game of Thrones" and for season six episode one of "Game of Thrones." The media guidance application may retrieve, from the guidance data, metadata for season five episode ten of "Game of Thrones" and metadata for season six episode one of "Game of Thrones." The media guidance application may compare metadata that includes the specific episode title (e.g., "The Red Woman"), season (e.g., six), television series (e.g., "Game of Thrones") of season six episode one of "Game of Thrones" to the metadata of a related media asset, which may be season five episode ten of "Game of Thrones" (e.g., episode title: "Mother's Mercy"; season: six; television series: "Game of Thrones"). The media guidance application may determine that the metadata of season six episode one of "Game of Thrones" matches metadata of season five episode ten of "Game of Thrones" because the "television series" metadata in both episodes is the same (e.g., both are "Game of Thrones"). The media guidance application may determine, because the "television series" metadata is a match, that season five episode ten of "Game of Thrones" meets the threshold amount of matched data, and thus is a related media asset.

The media guidance application may compare metadata of the related media asset to metadata corresponding to each media asset identifier of the plurality of media asset identifiers, and may determine, based on comparing the metadata of the related media asset to the metadata corresponding to each media asset identifier of the plurality of media asset identifiers, whether the metadata of the related media asset matches metadata of a media asset identifier of the plurality of media asset identifiers.

As an example, the media guidance application may determine if the user consumed a related media asset to season six episode one of "Game of Thrones." The media guidance application may compare metadata of season six episode one of "Game of Thrones" to the metadata of a related media asset, which may be season five episode ten of "Game of Thrones." The media guidance application may determine that the metadata of season six episode one of "Game of Thrones" matches metadata of season five episode ten of "Game of Thrones" because the "television series" metadata in both episodes is the same (e.g., both are "Game of Thrones").

In response to determining that the metadata of the related media asset matches the metadata of the media asset identifier of the plurality of media asset identifiers, the media guidance application may determine that the related media asset was previously consumed by the user, if it meets the threshold amount of matched metadata, as described above.

In some embodiments, the media guidance application may determine that a media asset is related to the user-requested media asset by comparing it to a data structure of related media assets corresponding to the requested media asset. The media guidance application may retrieve, from the guidance data, a default data structure of related media assets corresponding to the requested media asset. The media guidance may determine, from the data structure, whether the media asset that may be related to the user-requested media asset is found in the data structure. The media guidance application may determine that the media asset that may be related to the user-requested media asset is found in the data structure by comparing a media asset identifier for the media asset that may be related (e.g., television series title), that is retrieved from the viewing history data, to the corresponding media asset identifier in the data structure. In response to determining that, yes, the media asset that may be related to the user-requested media asset is found in the data structure, then the media guidance application may determine that the media asset is related to the user-requested media asset. For example, if the user-requested media asset is season six episode one of "Game of Thrones", and the media asset that may be related to the user-requested media asset is season five episode ten of "Game of Thrones," the media guidance application may retrieve, from the guidance data, a data structure of related media assets to season six episode one of "Game of Thrones" (e.g., the data structure of related media assets may contain the episodes of "Game of Thrones" spanning from season one to season six). The media guidance application may determine, from the data structure, that season five episode ten is in the data structure, and thus may determine that season five episode ten is a related media asset of the user-requested media asset.

In some embodiments, the media guidance application may determine if a media asset is related to the user-requested media asset by querying the guidance data for episodes of the same television series as the media asset, and determining from the search results whether the media asset that may be related to the requested media asset is in fact related. The media guidance application may query the guidance data for episodes of the same television series. The media guidance may compare the results of the query to the media asset that may be related to the requested media asset, and determine if the media asset that may be related to the requested media asset is in fact an episode of the same television series. If the media asset that may be related to the requested media asset is an episode of the same television series, the media guidance application may determine that the media asset that may be related to the requested media asset is in fact a related media asset. For example, if the user-requested media asset is season six episode one of "Game of Thrones", and the media asset that may be related to the user-requested media asset is season five episode ten of "Game of Thrones," the media guidance application may query the guidance data for episodes of "Game of Thrones." The media guidance application may compare the results of the query (e.g., a complete list of episodes from seasons one through six of "Game of Thrones") with season five episode ten of "Game of Thrones." The media guidance application may determine that season five episode ten of "Game of Thrones" was in the results of the query, and thus may determine that season five episode ten of "Game of Thrones" is a related media asset.

In some embodiments, the media guidance application may determine that the viewing history data is not sufficient to determine that the user has consumed the related media asset. The viewing history data may not be sufficient to determine that the user has consumed the related media if the media guidance application determines that the viewing history data indicates that the user only partially viewed the related media asset. The media guidance application may determine whether the related media asset was only partially consumed by determining if the viewing history data corresponding to the related media asset is flagged, where a flagged related media asset represents a related media asset that the user only partially consumed. As referred to herein, "partially consumed" is defined to mean a media asset that the user did not fully view (e.g., viewed less than 100% of the program), not including the beginning and end credits of a media asset, if applicable.

Although a flagged related media asset represents a partially consumed related media asset, the media guidance application may determine whether the partially consumed media asset still can be considered "consumed," based on threshold methods described below. In certain situations (e.g., certain genres, television series, etc.), the user may only have to consume a threshold percentage of the related media asset to still retain the major themes, plots, and content of the related media asset. The threshold percentage needed to determine consumption may be genre-specific, television series-specific, etc. For example, the media guidance application may determine that a partially consumed media asset (e.g., the user only consumed 60%) is an episode of reality television (e.g., from the metadata for the media asset). The threshold percentage of consumption required for an episode of reality television to be considered "consumed" may be low (e.g., 40%) because in general, reality television has little substance, so it may be very easy for the user to retain the major themes, plots, and content of reality television episodes. As another example, the media guidance application may determine that a partially consumed media asset (e.g., the user only consumed 60%) is an episode of a drama television series (e.g., from the metadata for the media asset). The threshold percentage of consumption required for a drama episode of television to be consumed may be high (e.g., 80%) because in general, drama television series have very complex themes, plots, and content, so the user may have to consume almost all of the media asset to retain the major themes, plots, and content.

If the media guidance application determines that a related media asset is flagged in the viewing history data, the media guidance application may determine if the user has consumed the related media asset based on the threshold methods described below.

The media guidance application may determine that different media assets need different threshold percentages because some television series and genres are more plot-heavy than others and require more user consumption to fully absorb what is happening in each episode. The media guidance application may also take into account that some television series have longer introduction sequences and credits, which may factor into the threshold percentages. The media guidance application may determine the threshold by either retrieving a default threshold from the profile, or dynamically determining the threshold based on certain criteria.

In some embodiments, the media guidance application may retrieve the threshold percentage from a default value in the guidance data. The threshold percentage may be a default value for all media assets (e.g., 50%, 70%, etc.), that the user may adjust. The default threshold percentage values may be predefined by an editor (e.g., an editor for a television series) and stored in the guidance data.

In some embodiments, the media guidance application may use a "genre" criteria to determine the threshold percentage. The media guidance application may retrieve, from metadata in the guidance data, the genre of the related media asset. The media guidance may then retrieve, from a lookup table in the user profile in the database, a threshold percentage corresponding to the related media asset's genre (e.g., action, comedy, horror, fantasy, reality, crime, etc.). The media guidance application may create the lookup table in the guidance data; the lookup table may initially store default threshold percentages from the guidance data for each genre, where each genre's threshold percentage is directly related to the amount of plot substance it normally and historically contains, which may be predefined by an editor (e.g., the threshold percentage for the "reality" genre would be much lower than the threshold percentage for the "drama" genre). The default threshold percentages in the lookup table may be edited by the user, and the media guidance application may store these updated threshold percentages in a lookup table in the profile.

In some embodiments, the media guidance application may use a "television series" criterion to determine the threshold percentage. The media guidance application may retrieve, from metadata in the guidance data, the title of the television series of the related media asset. The media guidance may then retrieve, from a lookup table in the guidance data, a threshold percentage corresponding to the related media asset's specific television series (e.g., "Game of Thrones," "Enlightened," "The Sopranos," "Westworld," "In Treatment," etc.). The media guidance application may create the lookup table in the guidance data; the lookup table may use default threshold percentages predefined by an editor for each television series from the guidance data. The default threshold percentages in the lookup table may be edited by the user, and the media guidance application may store these updated threshold percentages in a lookup table in the profile.

For example, the related media asset may be an episode of a fantasy television series, such as "Game of Thrones." The media guidance application may retrieve, from the guidance data, metadata for the related media asset. The media guidance application may determine from the "genre" category of metadata (e.g., genre: FANTASY) for the related media asset that the genre for the episode of "Game of Thrones" is fantasy. The media guidance application may retrieve, from the lookup table in the guidance data, the default threshold percentage that corresponds to the genre, "fantasy." The media guidance application may determine, by retrieving the value of the "fantasy" field of the lookup table, a threshold percentage for "fantasy" (e.g., it may be 80%).

As another example, the related media asset may be an episode of the television series "Westworld." The media guidance application may retrieve, from the guidance data, metadata for the related media asset. The media guidance application may determine from the "television series" category of metadata (e.g., television series: WESTWORLD) for the related media asset that the television series is "Westworld." The media guidance application may retrieve, from the lookup table in the user profile, the user-edited threshold percentage that corresponds to the television series, "Westworld." The media guidance application may determine, by retrieving the value of the "Westworld" field of the lookup table, a default threshold percentage for "Westworld" (e.g., it may be 75%).

In some embodiments, when the media guidance application is determining whether the related media asset was previously consumed by the user, the media guidance application may determine the percentage of the related media asset that was consumed.

In some embodiments, the media guidance application may determine from the guidance data the portions of the related media asset that the user consumed (e.g., the media asset is from an OTT (Over-The-Top) provider, such as Netflix, that tracks the portions of the media asset that the user watched). The media guidance application may retrieve data corresponding to the portions that include the length of time of each portion. The media guidance application may retrieve the total runtime of the related media asset from the guidance data. The media asset may add the lengths of time of each portion together to determine the complete length of time that the user consumed the media asset. The media guidance application may determine the percentage of the related media asset that was consumed by dividing the complete length of time by the total runtime of the related media asset.

In some embodiments, the media guidance application may determine the percentage of the related media asset that was consumed based on what parts of the media asset were consumed. The media guidance application may split the related media asset into three parts (e.g., beginning, middle, and end). The media guidance application may retrieve, from the guidance data, a percentage of how much of each part the user consumed; these percentages may be calculated by the media guidance application using either the portion data (as described above) or the time stamp data (as described below). The media guidance application may take an average of the two parts that have the highest percentages and set this average to be the percentage of the related media asset that was consumed. For example, the user may have watched thirty minutes out of a sixty-minute television episode. The user may have watched 15 minutes of the beginning of the show, skipped through the middle of the episode (e.g., because the user thought the middle was boring and too slow), and then watched 15 minutes of the end of the episode. The media guidance application may determine that the consumption percentage for the beginning of the episode was 75% (e.g., 15 min/20 min), for the middle of the episode was 0% (e.g., 0 min/20 min) and for the end of the episode was 75% (e.g., 15 min/20 min). The media guidance application may determine that the average of the beginning of the episode and the end of the episode percentages is 75% (e.g., (75%+75%)/2). The media guidance application may set this average percentage to be the percentage of the related media asset that was consumed.

In some embodiments, the media guidance application may determine the percentage of the related media asset that was consumed based on the amount of time the user consumed the related media asset. The media guidance application may retrieve, from the information, an amount of time that the related media asset was consumed by the user. The media guidance application may determine the amount of time from the time stamp data in the profile. As described herein, "time stamp data" is defined to mean a data set where each data point identifies the start and stop time and date of a specific media asset that the user consumed. For example, the media guidance application may retrieve time stamp data from the profile in the database corresponding to the related media asset. The media guidance application may determine, by subtracting the start and end times from the time stamp data (e.g., GameofThrones|S5E10|6/14/2015|10:00-10:45 PM) that the user consumed the related media asset for a certain amount of time (e.g., forty-five minutes). For example, the media guidance application may determine from the time stamp data that the user watched season five episode ten of "Game of Thrones" for forty-five minutes.

The media guidance application may retrieve, from the guidance data, a total runtime of the related media asset and may compare the amount of time that the user spent consuming the related media asset to the total runtime of the related media asset. For example, the media guidance application may retrieve the total runtime of the related media asset from metadata found in the guidance data. For example, the media guidance application may determine from the "episode length" metadata that the runtime for season five episode ten of "Game of Thrones" was fifty minutes. If the user watched forty-five minutes of season five episode ten of "Game of Thrones," the media guidance application may compare the forty-five minutes of viewed time to the fifty-minute runtime.

The media guidance application may determine, from the comparison, a percentage of the related media asset that the user consumed. The media guidance application may calculate the percentage by dividing the amount of time that the user spent consuming the related media asset by the total runtime of the related media asset.

The media guidance application may determine whether the percentage exceeds a threshold percentage. The media guidance application may determine the threshold percentage based on the methods described above.

For example, if the user viewed forty-five minutes out of a fifty-minute episode of "Game of Thrones," the media guidance application may determine that the user consumed 90% of the episode. The media guidance application may retrieve a threshold percentage, based on the methods described above. The media guidance application may then compare the 90% consumption with the retrieved threshold percentage (e.g., 50%).

In response to determining that the percentage exceeds the threshold percentage, the media guidance application may determine that the related media asset was previously consumed. If the media guidance application determines that the user consumed more of the episode than the threshold percentage, then the media guidance application may determine that the episode was previously consumed by the user.

For example, if the user viewed 90% of season six episode one of "Game of Thrones," the media guidance application may retrieve, using the "genre" criterion for determining the threshold percentage (e.g., 80%), corresponding to the "fantasy" genre (e.g., "Game of Thrones" metadata for genre is FANTASY). The media guidance application may compare the amount consumed (e.g., 90%) with the threshold percentage (e.g., 80%), and determine that the amount consumed exceeds the threshold percentage. The media guidance application may determine that the user consumed season six episode one of "Game of Thrones."

In some embodiments, the media guidance application may determine, using the threshold percentage method described above, if the user has consumed a related media asset during consumption when the threshold is reached, or soon after the user finishes viewing the related media asset. The media guidance application may determine, from the guidance data, that the user has completed viewing the related media asset when either the related media asset has ended or the user stops viewing the related media asset. The media guidance application may determine the percentage of the related media asset that the user consumed. The media guidance application may calculate this percentage using similar methods as described above. The media guidance application may, using the threshold percentage method described above, determine if the related media asset was consumed. In response to determining that the related media asset was consumed by the user, the media guidance application may use a bit flag in the profile corresponding to the related media asset to indicate that the related media asset was consumed. The media guidance application may indicate that the related media asset was consumed by setting the bit flag to one, and may indicate that the related media asset was not consumed by setting the bit flag to zero. For example, the media guidance application may determine that the user has finished consuming the related media asset (e.g., the user stopped watching the related media asset by tuning to another media asset after watching the related media asset for forty minutes). The media guidance application may determine, based on the methods described above, the percentage of the related media asset that the user consumed (e.g., the percentage may be 80% if the user consumed 40 minutes of a 50-minute episode). The media guidance application may determine, based on the methods described above, that the percentage exceeds the threshold percentage. In response to determining that the percentage exceeds the threshold percentage, the media guidance application may set the bit flag corresponding to the related media to one.

In some embodiments, in response to determining that the related media asset was previously consumed, the media guidance application may determine whether the user remembers the content of the related media asset. The media guidance application may use the data corresponding to the consumed related media asset to determine whether the user remembers the content of the related media asset. The media guidance application may determine whether the user remembers the content of the related media asset based on the period of time between when the user consumed the related media asset and the user requesting the media asset. The media guidance application may determine that if the period of time exceeds a threshold period of time (e.g., which represents the maximum amount of time between consuming the related media asset and requesting the media asset before the user forgets the content of the related media asset), then the user may not remember the related media asset. For example, the media guidance application may determine that the user remembers the content of the related media asset if the user consumed the related media asset two days ago (e.g., does not exceed the threshold period of time), but, on the other hand, may determine that the user does not remember the content of the related media asset if the user consumed the related media asset two years ago (e.g., exceeds the threshold period of time).

The media guidance application may determine that different media assets need different threshold periods of time because television series and genres have unique themes, plots, and content, and the user may forget this information at different rates depending on what television series or genre the media asset is. For example, the media guidance application may determine, from the historical theme, plot, and content data for the "drama" genre that media assets in the "drama" genre have very complex themes, plots, and content. The media guidance application may determine that because of the complexities, the user may forget the themes, plots, and content of a related media asset more quickly than a media asset with fewer complexities (e.g., a media asset that falls in the "reality" genre). Thus, the media guidance application may determine that the threshold period of time for the genre "drama" is shorter than other genres (e.g., shorter than the "reality" genre). The media guidance application may determine the threshold period of time by either retrieving a default threshold from the profile, or dynamically determining the threshold based on certain criteria.

In some embodiments, the media guidance application may retrieve a default threshold period of time from the guidance data. The threshold period of time may be a predetermined value for all media assets (e.g., seven days, 30 days, etc.), that the user may adjust.

In some embodiments, the media guidance application may use a "genre" criteria to determine the threshold period of time. The media guidance application may determine that the threshold periods of time are different depending on the genre, because different genres have different plot complexities, types of content, etc. The media guidance application may retrieve, from metadata in the guidance data, the genre of the related media asset. The media guidance may then retrieve, from a lookup table in the guidance data, a threshold period of time corresponding to genre equivalent to the related media asset's genre (e.g., action, comedy, horror, fantasy, reality, crime, etc.). The media guidance application may create the lookup table in the guidance data; the lookup table may use a default threshold period of time for each genre, assigned by an editor, found in the guidance data, where each genre's threshold period of time is inversely related to the amount of content it contains (e.g., the threshold period of time for the "reality" genre would be much longer than the threshold period of time for the "drama" genre). The default threshold period of time in the lookup table may be edited by the user, and the media guidance application may store these updated threshold values in a lookup table in the profile.

In some embodiments, the media guidance application may use a "television series" criteria to determine the threshold period of time. The media guidance application may determine that the threshold periods of time are different depending on the television series, because each television series has unique plot complexities, amount of content, etc. The media guidance application may retrieve, from metadata in the guidance data, the title of the television series of the related media asset. The media guidance may then retrieve, from a lookup table in the guidance data, a threshold period of time corresponding to the related media asset's specific television series (e.g., "Game of Thrones," "Enlightened," "The Sopranos," "Westworld," "In Treatment," etc.). The media guidance application may create the lookup table in guidance data; the lookup table may use a default threshold period of time, assigned by an editor, for each television series found in the guidance data. The default threshold period of time in the lookup table may be edited by the user, and the media guidance application may store these updated threshold periods of time in a lookup table in the profile.

For example, the related media asset may be an episode of reality television, such as "The Real Housewives of New York City." The media guidance application may retrieve, from the guidance data, metadata for the related media asset. The media guidance application may determine from the "genre" category of metadata (e.g., genre: REALITY) for the related media asset that the genre for the episode of "The Real Housewives of New York City" is a "reality" genre. The media guidance application may retrieve, from the lookup table in the guidance data, the threshold period of time that corresponds to the genre, "reality." The media guidance application may determine, by retrieving the default value of the "reality" field of the lookup table, a threshold period of time for "reality" (e.g., it may be 90 days).

As another example, the related media asset may be an episode of the television series "Westworld." The media guidance application may retrieve, from the guidance data, metadata for the related media asset. The media guidance application may determine from the television series category of metadata (e.g., television series: WESTWORLD) for the related media asset that the television series is "Westworld." The media guidance application may retrieve, from the lookup table in the user profile, the updated threshold period of time that corresponds to the television series, "Westworld." The media guidance application may determine, by retrieving the value of the "Westworld" field of the lookup table, a user-edited threshold period of time for "Westworld" (e.g., it may be 14 days).

After the media guidance application determines that the related media asset was previously consumed, the media guidance application may then determine when the related media asset was last consumed, to determine the time lapse between the user consuming the related media and the user requesting the media asset, to help determine if the user likely remembers the content in the related media asset. In response to determining that the related media asset was previously consumed, the media guidance application may determine, from the information, a time at which the related media asset was previously consumed. For example, the media guidance may determine from the time stamp data (e.g., GameofThrones|S5E10|6/14/2015|10:00-10:45 PM) that the user watched season five episode ten of "Game of Thrones" on Jun. 14, 2015 at 10:00 PM.

The media guidance application may determine a period of time between receiving the request and the time at which the related media asset was consumed. For example, if the user watched season five episode ten of "Game of Thrones" on Jun. 14, 2015 and requested to watch season six episode 1 of "Game of Thrones" on Apr. 24, 2016, the media guidance application may determine the period of time between watching the two episodes is 315 days.

The media guidance application may determine whether the period of time between receiving the request and the time at which the related media asset was consumed exceeds a threshold period of time. The media guidance application may determine the threshold period of time, based on the methods described above. For example, if the threshold period of time is 90 days, the media guidance application may determine that the period of time between watching two episodes of "Game of Thrones" (e.g., 315 days) exceeds the threshold.

The media guidance application may adjust the threshold period of time based on user input. The media guidance application may determine, when playing back a predefined or customized playlist of highlights, as described below, that the user skips past the playlist of highlights (e.g., fast-forwards through the playlist of highlights). The user may skip through the playlist because the user may have an exceptional memory, and thus remembers the related content to the media asset. When the media guidance application determines that the skip occurs, the media guidance application may log the skip in the profile, and adjust the threshold period of time. The media guidance application may lengthen the threshold period of time each time a skip is determined, and the media guidance application may determine the amount of time to lengthen the threshold by based on the frequency of the skips. When the frequency of the skips increases, the media guidance application may choose longer lengths of time to lengthen the threshold by. The media guidance application may add the length of time to the threshold, and store the updated threshold value as the threshold value. For example, if the media guidance application determines that the user skips once a week, the media guidance may add a length of time (e.g., may be one day) to the threshold period of time. If the user increases the frequency of their skips to once a day, the media guidance application may add a longer length of time (e.g., may be three days) to the threshold period of time.

In some embodiments, in response to determining that the period of time does not exceed the threshold, the media guidance application may determine, using a minimum period of time threshold, whether a predefined playlist of highlights should be played back for the user. The minimum period of time threshold represents the period of time where the user fully remembers the content of related media assets, and does not need to be recapitulated on any content related to the media asset. The media guidance application may retrieve the minimum period of time threshold from the guidance data, where the media guidance application may determine that the minimum period of time threshold is a default value that may be adjusted by the user. The media guidance application may compare the period of time to the minimum period of time threshold. If the period of time does not exceed the minimum period of time threshold, the media guidance application may not play back a predefined playlist of highlights. For example, the media guidance may retrieve the default minimum period of time threshold from the guidance data (e.g., one day). The media guidance application may compare the period of time (e.g., one hour prior to the user request the user last viewed related content) to the default minimum period of time threshold. The media guidance application may determine that the period of time (e.g., one hour) does not exceed the minimum period of time threshold (e.g., one day), and may not play back a predefined playlist of highlights.

In some embodiments, in response to determining that the period of time does not exceed the threshold, the media guidance application may play back a predefined playlist of highlights, where the highlights comprise a predetermined scene from the related media asset. The threshold represents the amount of time it takes for the user to forget the content in the related media asset. The media guidance application may determine, based on the period of time not exceeding the threshold, that the user remembers the content of the related media asset, and thus a predefined playlist of highlights will adequately refresh the user's memory on previous content (e.g., old plot lines) related to the media asset. The media guidance application uses the predefined playlist of highlights when the user only needs a brief recapitulation on the previous content.

For example, if the user wants to watch season six episode ten of "Game of Thrones" and watched the season six episode nine of "Game of Thrones" seven days prior to watching episode ten, the media guidance application may retrieve a threshold period of time based on the television series criterion described above. The media guidance application may retrieve, from the guidance data, metadata for season six episode ten of "Game of Thrones." The media guidance application may determine from the television series category of metadata (e.g., television series: GAME OF THRONES) for the media asset that the television series title is "Game of Thrones." The media guidance application may retrieve, from the lookup table in the user profile, the threshold period of time that corresponds to the television series, "Game of Thrones." The media guidance application may determine from the lookup table that the threshold period of time for "Game of Thrones" is thirty days. The media guidance application may determine that the seven-day period of time does not exceed the threshold of thirty days. The media guidance application may then play a predefined playlist of highlight clips that briefly recapitulates what happened at the end of episode nine.

In some embodiments, when the media guidance application is playing back a predefined playlist of highlights, the media guidance application may retrieve, from the information, a plurality of candidate-predefined playlists. The candidate-predefined playlists may include default playlists stored in the profile, as well as generic playlists generated by the media guidance application. The media guidance application may play back the candidate-predefined playlist that corresponds to the user's preferences, based on a ranking system (e.g., the predefined playlist played back would be the most in line with the user's preferences).

The media guidance application may retrieve, from the information, candidate-predefined playlists that are default playlists (e.g., that are created by the makers of the media asset). For example, if the media asset is an episode of "Game of Thrones," the media guidance application may retrieve a playlist of generic recapitulation clips generated by the editors of "Game of Thrones" for play before each episode of "Game of Thrones."

The media guidance application may generate generic playlists to be candidate-predefined playlists. The media guidance application may retrieve, from the information, clips from related media assets to the user's requested media asset. The media guidance application may combine a set amount of clips to create a generic playlist, where the set amount of clips is a default value found in the guidance data. The set amount of clips default value be found in a lookup table in the guidance data, where the media guidance application retrieves the amount of clips default value corresponding to the period of time (e.g., the amount of clips value is linearly related to the period of time data, so as the period of time gets longer, the amount of clips value gets higher, making the recapitulation time vary based on how long it's been since the user last watched the related media). The media guidance application may store the generic playlist as a candidate-predefined playlist in the information.

For example, the requested media asset may be episode ten of season six of "Game of Thrones." The media guidance application may retrieve clips from previously released episodes of "Game of Thrones" in season six. The media guidance application may take one clip from each previous episode in season six (e.g., episode one through episode nine), and combine the clips into a playlist. The media guidance application may store this playlist as a candidate-predefined playlist in the information.

The media guidance application may determine, from the information, the preferred attributes of the user. The media guidance application may determine the preferred attributes of the user from the user preferences in the information. For example, if the requested media asset is an episode of "Game of Thrones," the media guidance application may determine from the user preferences in the user profile that the user's preferred attributes related to "Game of Thrones" are specific plots (e.g., Cersei Lannister's, a character in "Game of Thrones," revenge against the Faith), preferred characters (e.g., the "Game of Thrones" characters Arya Stark, Cersei Lannister, Brienne of Tarth), preferred actors (e.g., the "Game of Thrones" actors Lena Headey, Emilia Clarke, Peter Dinklage, etc.), and a preferred recap length (e.g., thirty seconds, two minutes, etc.).

The media guidance application may compare attributes of each of the candidate-predefined playlists to the preferred attributes. The media guidance application may determine attributes of each of the candidate-predefined playlists from metadata from the guidance data. For example, if the requested media asset is an episode of "Game of Thrones," the media guidance application may retrieve, from the information, plot metadata for the predefined playlists. The media guidance application may compare the featured plots of each of the "Game of Thrones" predefined playlists to the user's preference for plots about Cersei Lannister (a character in "Game of Thrones).

The media guidance application may rank each of the candidate-predefined playlists based on the comparing of the attributes of each of the candidate-predefined playlists to the preferred attributes and may determine the candidate-predefined playlist with the highest rank. The media guidance application may determine that the candidate-predefined playlist with the highest rank most corresponds to the user's preferences.

In some embodiments, the media guidance application may determine the rank of each of the candidate-predefined playlists based on how many of a candidate-predefined playlist's attributes match with the preferred attributes. The media guidance application may rank candidate-predefined playlists with more matches higher than those with less matches. For example, the media guidance application may rank a candidate-predefined playlist that has five attribute matches higher than a candidate-predefined playlist that has three matches.

For example, the media guidance application may determine that the user loves the character of Cersei Lannister in "Game of Thrones." The media guidance application may compare the attributes of the candidate "Game of Thrones" playlists with the attribute of the user preferring Cersei Lannister, and may rank the candidate playlists based on how featured Cersei Lannister is in each playlist (e.g., candidate playlists featuring Cersei Lannister would be ranked higher than candidate playlists that do not feature Cersei Lannister).

The media guidance application may then play back the candidate-predefined playlist with the highest rank. For example, if the playlists are ranked based on how much Cersei Lannister is featured in each playlist, the media guidance application may determine that the playlist where Cersei Lannister is featured the most (e.g., she has the most screen time) may be played back.

As previously described above, the media guidance application may determine whether the period of time between receiving the media asset request and the time at which the related media asset was consumed exceeds a threshold period of time. When the media guidance application determines that the period of time does not exceed the threshold period of time, the media guidance application may play back a predefined playlist of highlights, as described above. When the media guidance application determines that the period of time exceeds the threshold period of time, the media guidance application may play back a customized playlist of highlights, as described below. The media guidance application may determine, based on the period of time exceeding the threshold, that the user does not remember the content of the related media asset, and thus the customized playlist of highlights, focused on refreshing the user on forgotten content, will adequately refresh the user's memory on previous content (e.g., old plot lines) related to the media asset.

In response to determining that the period of time exceeds the threshold, the media guidance application may generate a customized playlist of highlights. For example, if the user wants to watch season six episode ten of Game of Thrones and watched the season six episode nine of "Game of Thrones" ninety days prior to watching episode ten, if the threshold period of time is thirty days, the media guidance application may determine that the ninety-day period of time exceeds the threshold of thirty days. The media guidance application may then generate a customized playlist of highlights, with highlights in the playlist chosen based on a ranking system of candidate highlight's preferred attributes, to ensure that the user's memory about the related content is refreshed. The media guidance system may determine candidates from the highlights, or retrieve default candidate highlights from the guidance data, and then analyze and choose candidate highlights to add to the customized playlist, based on the methods described below.

In some embodiments, when the media guidance application is generating the customized playlist of highlights, the media guidance application may determine which highlights are candidate highlights, based on the metadata of the highlights. The media guidance application may retrieve, from the database, highlights from a plurality of media assets, where the plurality of media assets comprises the related media asset. For example, the media guidance application may retrieve highlight clips from numerous different episodes of "Game of Thrones."

The media guidance application may compare metadata of the highlights to predefined metadata criteria. The media guidance application may retrieve the predefined metadata criteria from the guidance data. The media guidance application may determine that the predefined metadata criteria require that the metadata of the highlight clips contain certain metadata, which are, by default, flagged as "required" in the guidance data. For example, the metadata criteria may require that the metadata of the highlight clips contain certain titles, descriptions, characters, and/or actors.

The media guidance application may determine whether the metadata for each of the highlights meets the predefined metadata criteria. For example, if the metadata criteria require that the highlight clips metadata contain the season "season six" and the "Game of Thrones" character "Jamie Lannister," the media guidance application may determine which highlight clips meet these criteria.

In response to determining that a highlight meets the predefined metadata criteria, the media guidance application may determine that the highlight is a candidate highlight. For example, if one of the predefined metadata criterions is a metadata description that contains the phrase "Cersei Lannister," the media guidance application may determine that a highlight that has a metadata description that contains the phrase "Cersei Lannister" is a candidate highlight.

In some embodiments, the media guidance application may retrieve, from the database, candidate highlights from a plurality of media assets, where the plurality of media assets comprises the related media asset. For example, the media guidance application may retrieve the video clip highlights from the guidance data corresponding to all the "Game of Thrones" episodes throughout all six seasons of the television series.

The media guidance application may determine, based on the information from the profile, preferred attributes of the user (e.g., the preferred attributes of the user may be preferred plots, preferred actors, preferred characters, etc.). The preferred attributes of the user correspond to what attributes the user values, and are thus good indicators to the media guidance application that the user may want these attributes focused on in the customized playlist of highlights. The media guidance application may determine the preferred attributes of the user using the methods described below.

In some embodiments, when the media guidance application is determining the preferred attributes of the user, the media guidance application may determine the preferred attributes of the user by using a combination of user preferences and metadata. The media guidance application may retrieve, from the information, preferences for the user (e.g., preferred plots, preferred actors, preferred characters, etc.). The media guidance application may then determine that the preferences for the user are the preferred attributes of the user.

The media guidance application may determine the preferred attribute criteria using a ranking system of the preferred attributes, which may contain attributes from the preferences for the user and the metadata for the media asset. The media guidance application may retrieve a default rank from the guidance data corresponding to a rank (e.g., high, medium, low) for each preferred attribute, which may be adjusted by the user. The media guidance application may divide the categories into different subsets based on rank (e.g., a subset for attributes ranked high, a subset for attributes ranked medium, and a subset for attributes ranked low). The media guidance application may determine that the preferred attributes in the "high" subset become the preferred attribute criteria.

For example, the media guidance application may determine, from the user preferences, preferred attributes for the user for the television series, "Game of Thrones." The media guidance application may determine that the user's preferred characters are Cersei Lannister, Arya Stark, and Brienne of Tarth. The media guidance application may retrieve, from the guidance data, a default preferred attribute rank for the user's preferred characters (e.g., the rank is high). The media guidance application may place the user's preferred characters into the preferred attribute "high" subset. The media guidance application may determine that one of the preferred attribute criterions includes "at least three of the user's preferred characters (e.g., Cersei Lannister, Arya Stark, and Brienne of Tarth) are featured in the candidate highlight."

As another example, the media guidance application may determine from the user preferences (e.g., preferred plots, preferred actors, preferred characters, etc.) that a preferred attribute is the "playlist runtime" (e.g., no longer than 90 seconds). The media guidance application may determine from the guidance data that the default "playlist runtime" attribute is ranked high, and that it is in the preferred attribute "high" subset. The media guidance application may determine that one of the preferred attribute criterions includes that "the total runtime of the playlist of customized highlights is no longer than ninety seconds."

The media guidance may retrieve, from the guidance data, metadata for the media asset (e.g., tags, description, title, season, etc.).

The media guidance application may determine, from the metadata, metadata attributes. The media guidance application may determine that the metadata attributes may be certain titles, descriptions, characters, actors, etc., corresponding to the metadata categories for the media asset.

The media guidance application may select the metadata attributes to be candidate-preferred attributes. For example, if the metadata attributes are "description" and "characters," the media guidance application may select the metadata attribute "description" and "characters" to be candidate-preferred attributes.

The media guidance application may compare the candidate-preferred attributes to the preferred attribute criteria. For example, the media guidance application may compare the candidate-preferred attributes (e.g., the description and the characters) to the preferred attribute criteria (e.g., at least three of the user's preferred characters are present in the candidate highlight).

The media guidance application may determine, from the comparison, the subset of candidate-preferred attributes that meet the preferred attribute criteria. For example, the media guidance application may determine that the "characters" metadata attribute (e.g., which may contain the "Game of Thrones" characters Jamie Lannister, Cersei Lannister, Arya Stark, The Hound, and Brienne of Tarth) meets the preferred attribute criteria (e.g., at least three of the user's preferred characters (e.g., Cersei Lannister, Arya Stark, and Brienne of Tarth) are present in the candidate highlight).

The media guidance application may select the subset of candidate-preferred attributes to be the preferred attributes. For example, if the subset of candidate-preferred attributes contains the "characters" attribute and the "plot" attribute, the media guidance application may select the "characters" candidate-preferred attribute and the "plot" candidate-preferred attribute to be the preferred attributes.

In some embodiments, when the media guidance application is determining the preferred attributes of the user, the media guidance application may use a combination of social media data and metadata to determine the preferred attributes, as described below. As described herein, "social media data" may be any data that is related to a social network. For example, social media data may be data (e.g., words) found in a post on a social media site. The media guidance application may determine from the user's social media data attributes that would not be apparent from the user preferences or the metadata otherwise. For example, the media guidance application may determine the user's feelings towards certain characters, plots, etc., based on blog posts, on online message boards, posts on social media sites, etc., all of which are attributes that would not be known to the media guidance application without such social media data. The media guidance application may retrieve, from a social media profile corresponding to the user, social media data for the user. For example, the media guidance application may retrieve the user's social media data from the user's social media accounts (e.g., Facebook, Twitter, Instagram, and/or SnapChat profiles, etc.)

The media guidance application may determine, from the social media data, social media attributes for the user. The media guidance application may determine the social media attributes from the social media data by searching through the social media data using keyword matching. The media guidance application may retrieve keywords corresponding to a media asset from a lookup table in the information. The media guidance may search through the social media data using the keywords to determine any matches. In the event that there is a match/matches, the media guidance application may determine a social media attribute from the match. For example, the media guidance application may retrieve social media data from the information. The media guidance application may retrieve keywords associated with "Game of Thrones" (e.g., Cersei Lannister, Game of Thrones, white walkers, Ned Stark, etc.) from the lookup table in the information. The media guidance application may search through the user's social media data and may find a match in the user's Twitter social media data. The media guidance application may determine from the user's tweet "Cersei Lannister is the best character on Game of Thrones," that the user's favorite character on "Game of Thrones" is Cersei Lannister, and create a social media attribute for the match (e.g., favorite character: Cersei Lannister).

The media guidance application may combine the metadata attributes, determined using the methods described above, and the social media attributes to form the candidate-preferred attributes. For example, the media guidance application may combine the metadata attributes (e.g., certain titles, descriptions, characters, and/or actors) with the social media attributes (e.g., the user's preferred characters as determined by the user's Twitter profile). After determining the preferred attributes, using any of the methods described above, the media guidance application may use the preferred attributes to determine which candidate highlights to add to the customized playlist of highlights (e.g., based on candidate highlight ranking as described in detail below).

The media guidance application may compare attributes of each of the candidate highlights to the preferred attributes. For example, the user may prefer the "Game of Thrones" character Cersei Lannister, and the media guidance application may compare this preferred attribute to the candidate highlight attributes.

After comparing the attributes of the candidate highlights to the preferred attributes, the media guidance application may rank the candidate highlights to determine which candidate highlights to add to the customized playlist of highlights. The media guidance application may rank candidate highlights because the ranking reflects how valuable (e.g., at refreshing the user's memory) each candidate highlight is in the task of refreshing the user's memory of forgotten content. Highly ranked candidate highlights will be much better at refreshing the user's memory than lower ranked candidate highlights. The media guidance application may rank each of the candidate highlights based on the comparing of the attributes of each of the candidate highlights to the preferred attributes.

In some embodiments, the media guidance application may rank each candidate highlight based on what percentage of the preferred attributes the candidate highlight contains (e.g., ranked from the highest percentage to the lowest percentage). The media guidance application may determine how many preferred attributes the candidate highlight possesses based on the methods described above. The media guidance application may calculate the percentage of the preferred attributes by dividing the number of preferred attributes that the candidate highlights contains by the total number of attributes of each candidate highlight. For example, if the media guidance application determines that a candidate highlight contains four out of five of the preferred attributes, the media guidance application may calculate that it contains 80% of the preferred attributes. The media guidance application may determine that it will rank higher than a candidate highlight that contains 50% of the preferred attributes.

In some embodiments, when the media guidance application is ranking each of the candidate highlights, the media guidance application may rank the candidate highlights based on a preferred attribute. The media guidance application may determine, based on the methods described below, a preferred attribute based on the preferences for the user, where the preferred attribute corresponds to at least one of the preferences. The media guidance application may retrieve, from the information, preferences for the user. For example, the media guidance application may retrieve the user's preferred actors, preferred plots, preferred characters, etc.

In some embodiments, the media guidance application may determine the preferred attribute based on default user preference ranks found in the guidance data, which may be adjustable by the user. The media guidance application may choose the preferred attribute that corresponds to the user preference with the highest rank. For example, the media guidance application may determine, from the user profile, that the user preference that ranks the highest is for "Game of Thrones" characters (e.g., Cersei Lannister and Arya Stark). The media guidance application may choose the preferred attribute "characters" because it corresponds to the user's highest ranked preference.

The media guidance application may compare the attributes of the candidate highlights to the preferred attribute. For example, the media guidance application may compare the attributes of the candidate highlights (e.g., the characters, plots, actors, etc., in the highlight clips) with the preferred attribute (e.g., the user's preferred characters).

The media guidance application may rank the candidate highlights based on the results of the comparison. The media guidance application may rank the candidate highlights that contain the preferred attribute higher than candidate highlights that do not contain the preferred attribute. For example, the media guidance application may rank candidate highlights that feature the "Game of Thrones" characters Cersei Lannister and Arya Stark (the user's preferred characters) higher than candidate highlights where Cersei Lannister and Arya Stark are not featured.

In some embodiments, when the media guidance application is ranking each of the candidate highlights, and where the preferences for the user are original preferences for the user, the media guidance application may periodically determine if the user preferences have changed, and update the ranking of the candidate highlights accordingly, as described in detail below.

The media guidance application may use a counter to determine if the user preferences have been updated. The media guidance application may initialize a counter to zero. The media guidance application may create and store the counter initialized to zero in the user profile in the database.

The media guidance application may retrieve the original preferences for the user from the profile in the database. For example, the media guidance application may retrieve, from the user profile, the user's original preferences, which may include that the user prefers the "Game of Thrones" characters Cersei Lannister and Arya Stark. Manners in which the media guidance application may retrieve the original preferences from the database are further discussed below with respect to FIGS. 2-5.

The media guidance application may periodically determine, using the methods described below, during a plurality of periods, whether the original preferences of the user have changed. The media guidance application may retrieve the time in a period from a default time period value found in the guidance data. For example, the media guidance may retrieve from the guidance data the predefined time period value, which may be three days. The media guidance application may then determine every three days whether the original preferences of the user have changed.

During each period of the plurality of periods, the media guidance application may retrieve, from the information, updated preferences of the user. For example, the media guidance application may retrieve, from the user profile, the user's updated preferences, which may include that the user prefers the "Game of Thrones" characters Jamie Lannister and John Snow.

The media guidance may determine whether the updated preferences of the user are different from the original preferences of the user. The media guidance application may compare both sets of preferences on a preference-by-preference basis to determine if there are differences between the two sets of preferences. For example, the media guidance application may determine the updated preferences of the user are different because the user now prefers the "Game of Thrones" characters Jamie Lannister and John Snow, when the user originally preferred the "Game of Thrones" characters Cersei Lannister and Arya Stark.

In response to determining that the updated preferences for the user are different, the media guidance application may add a value to the counter. The media guidance application may add the value to the counter (e.g., add a one), and may store the new value as the value of the counter in the user profile. For example, the media guidance application may add an integer (e.g., one) to the counter (e.g., which would change from zero to one), and may store the counter's new value (e.g., one) as the value of the counter in the user profile.

In response to determining that the updated preferences for the user are not different, the media guidance application may reset the counter to zero. For example, if the user's preferences did not change (e.g., the user's preferred "Game of Thrones" characters stayed the same), the media guidance application may reset the counter to zero (e.g., reset the counter from five to zero).

After updating the counter, the media guidance application may use the counter to determine if the user preferences have been updated. The media guidance application may determine whether the counter exceeds an update threshold. The media guidance application may retrieve a default update threshold from the guidance data, which may be adjustable by the user.

For example, the media guidance application may retrieve, from the guidance data, the update threshold. The media guidance application may determine, based on the threshold value (e.g., the threshold is equal to five, which represents five periods in a row of having different preferences), that the counter exceeds the threshold (e.g., the counter's value is six).

In response to determining that the counter exceeds the update threshold, the media guidance application may set the original preferences of the user to be the updated preferences of the user, and update the preferred attribute based on the updated preferences of the user, where the preferred attribute corresponds to at least one of the updated preferences. The media guidance application may store the updated preferences as the original preferences in the user profile in the database. The media guidance application may update the preferred attribute based on the methods for determining the preferred attribute as described above.

For example, in response to determining that the counter exceeds the update threshold, the media guidance application may set the original preferences to be the updated preferences (e.g., set the user's preferred characters to be Jamie Lannister and John Snow). The media guidance application may store the updated preferences as the original preferences in the user profile in the database. The media guidance application may update the preferred attribute, based on the methods described above (e.g., the preferred attribute is the user's preferred characters,) to be the user's preferred "Game of Thrones" characters, Jamie Lannister and John Snow.

After determining the ranking of each candidate highlight, based on the methods described above, the media guidance application may then create the customized playlist of highlights. The media guidance application may add each candidate highlight based on the ranking (e.g., picking the highest rated candidate highlights) to the customized playlist of highlights until a time parameter is reached.

In some embodiments, the media guidance application may retrieve the time parameter from the default time parameter value in the guidance data, which may be adjustable by the user. For example, the media guidance application may retrieve the time parameter from the guidance (e.g., the time parameter may be 30 seconds, two minutes, five minutes, etc.) and add the top-ranked highlight clips that feature Cersei Lannister until the time parameter is reached.

In some embodiments, when the media guidance application is generating the customized playlist of highlights, the media guidance application may add highlight clips from the related media assets last consumed by the user. The highlight clips may be ranked, using the methods described above. The media guidance application may use clips from the related media assets last consumed by the user because these related media assets represent content that the user forgotten, and thus are good candidates highlight clips to help refresh the user's memory.

The media guidance application may retrieve, from the information, information comprising a chronological data set of times at which each of a plurality of media assets related to the media asset were previously consumed, where the plurality of media assets related to the media asset comprises the related media asset. For example, the media guidance application may retrieve a chronological data set of times at which related media assets were consumed from the time stamp data in the information (e.g., GameofThrones|S6E02|5/1/2016|10:00-10:48 PM, GameofThrones|S6E03|5/8/2016|10:00-10:52 PM, GameofThrones|S6E04|5/15/2016|10:00-10:55 PM). The media guidance application may determine from the time stamp data that the user watched "Game of Thrones" on May 1, 2016, May 8, 2016, and May 15, 2016.

The media guidance application may determine, from the data set of times, an interval of time between two consecutive time data points in the data set of times. For example, the media guidance may calculate, using two data points, the difference in time between the two data points (e.g., calculate a 7 day interval of time between watching "Game of Thrones" on May 1, 2016 and May 8, 2016).

The media guidance application may determine whether the interval of time exceeds a threshold interval of time during which the user did not consume related media content (e.g., the threshold may be 24 hours, 7 days, 30 days, 90 days, etc.). The threshold interval of time may be determined using the same methods as the threshold period of time as described above.

In response to determining that the interval of time exceeds the threshold interval of time, the media guidance application may select highlights from a related media asset consumed directly before the interval in time and add the selected highlights to the customized playlist of highlights.

The media guidance application may determine the related media asset consumed directly before the interval in time using time stamp data from the information in the database. The media guidance application may retrieve the time stamp data from before the beginning of the interval in time. The media guidance application may determine, using the methods described above, the related media assets in the time stamp data. The media guidance application may determine, from the time stamp data, the related media asset consumed closest to the beginning of the interval of time.

For example, the media guidance application may determine that the user last watched "Game of Thrones" (e.g. season six episode 10) on Jun. 26, 2016. The media guidance application may determine that the interval of time between the request of the user to watch "Game of Thrones" and the last time the user watched "Game of Thrones" (Jun. 26, 2016) was one hundred days. The media guidance application may determine that this interval of time exceeds the threshold interval (e.g., the threshold interval may be 90 days). The media guidance application may then choose highlight clips from the "Game of Thrones" episode (e.g., season six episode 10) the user watched on Jun. 26, 2016 to add to the customized playlist of highlights.

After generating the customized playlist of highlights, using one of the methods described above, the media guidance application may play back the customized playlist of highlights.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
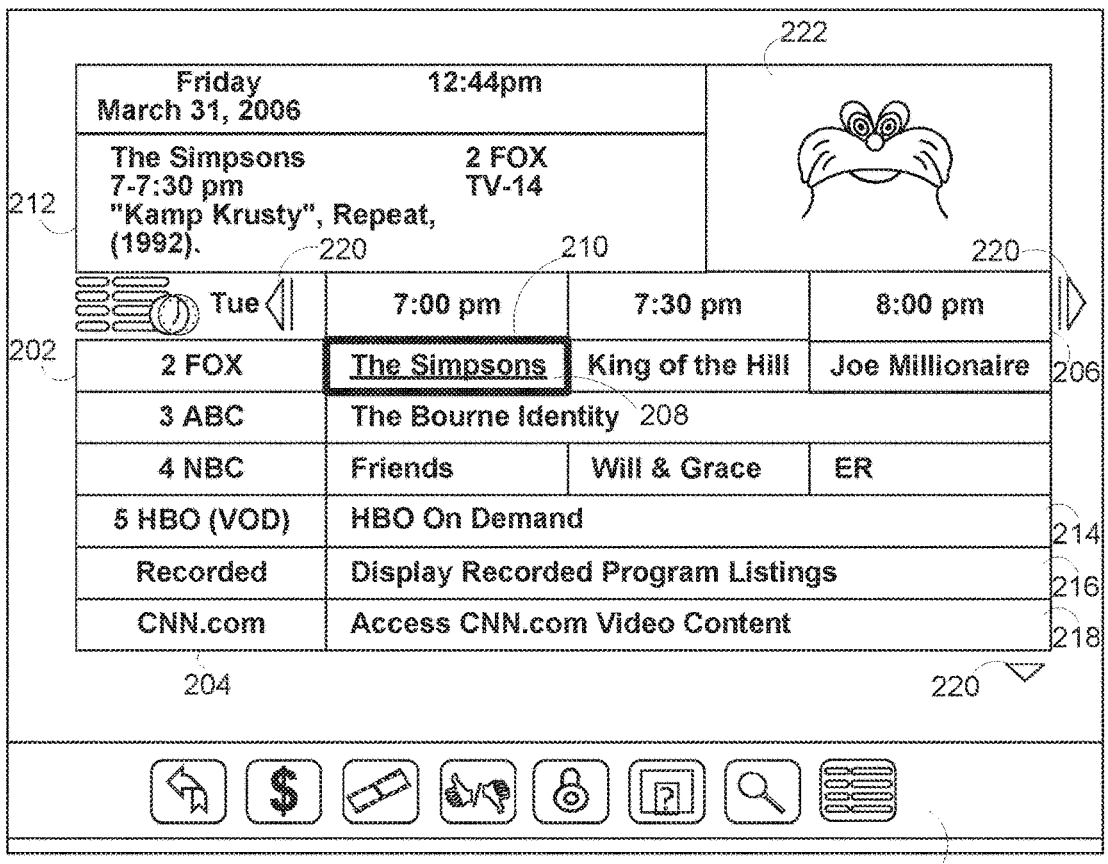
FIG. 2 shows an illustrative embodiment of a display screen that may be used to provide media guidance application listings and other media guidance information, in accordance with some embodiments of the disclosure.
Figure 3:
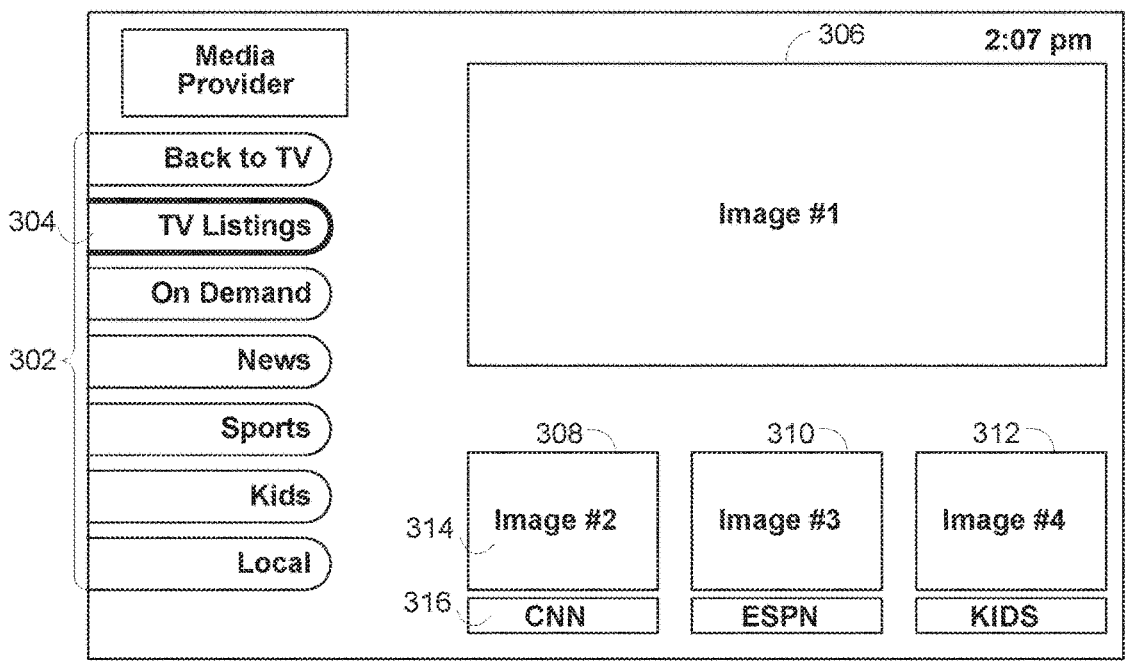
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
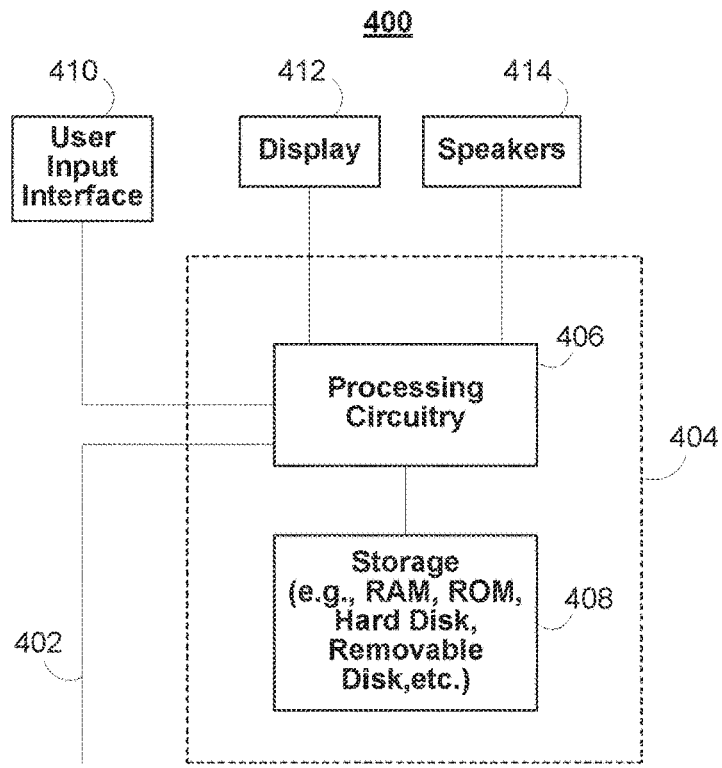
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
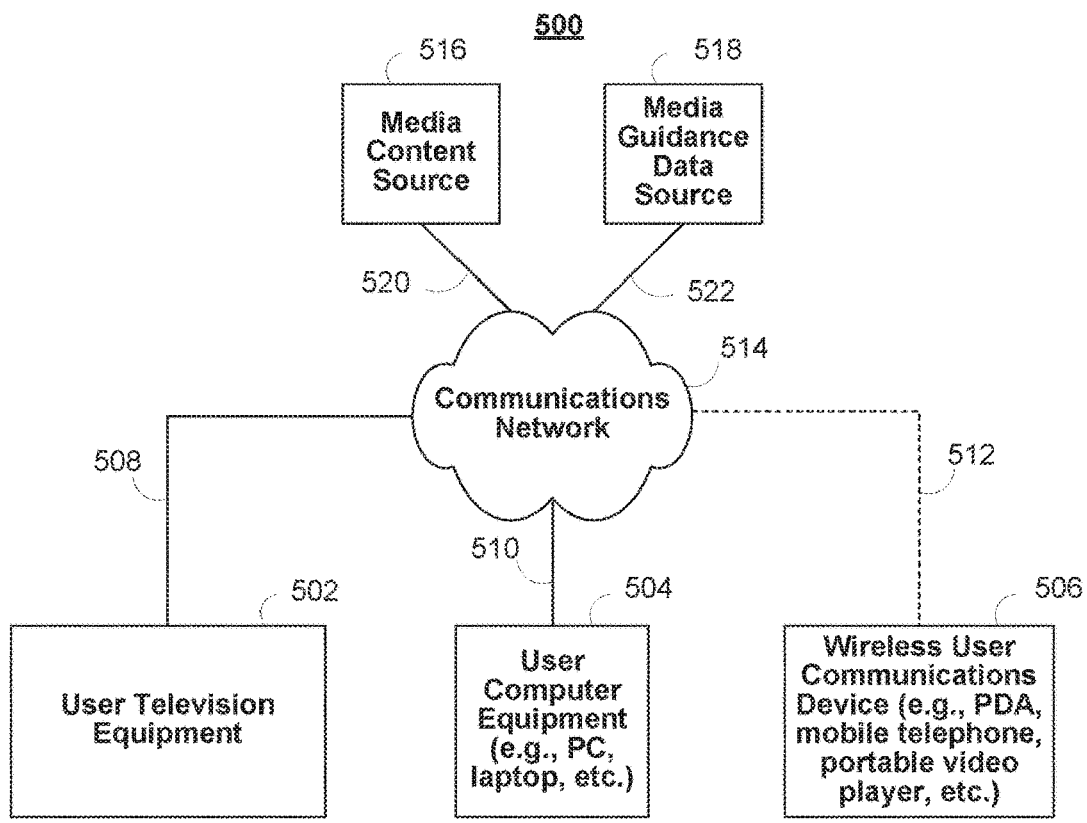
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
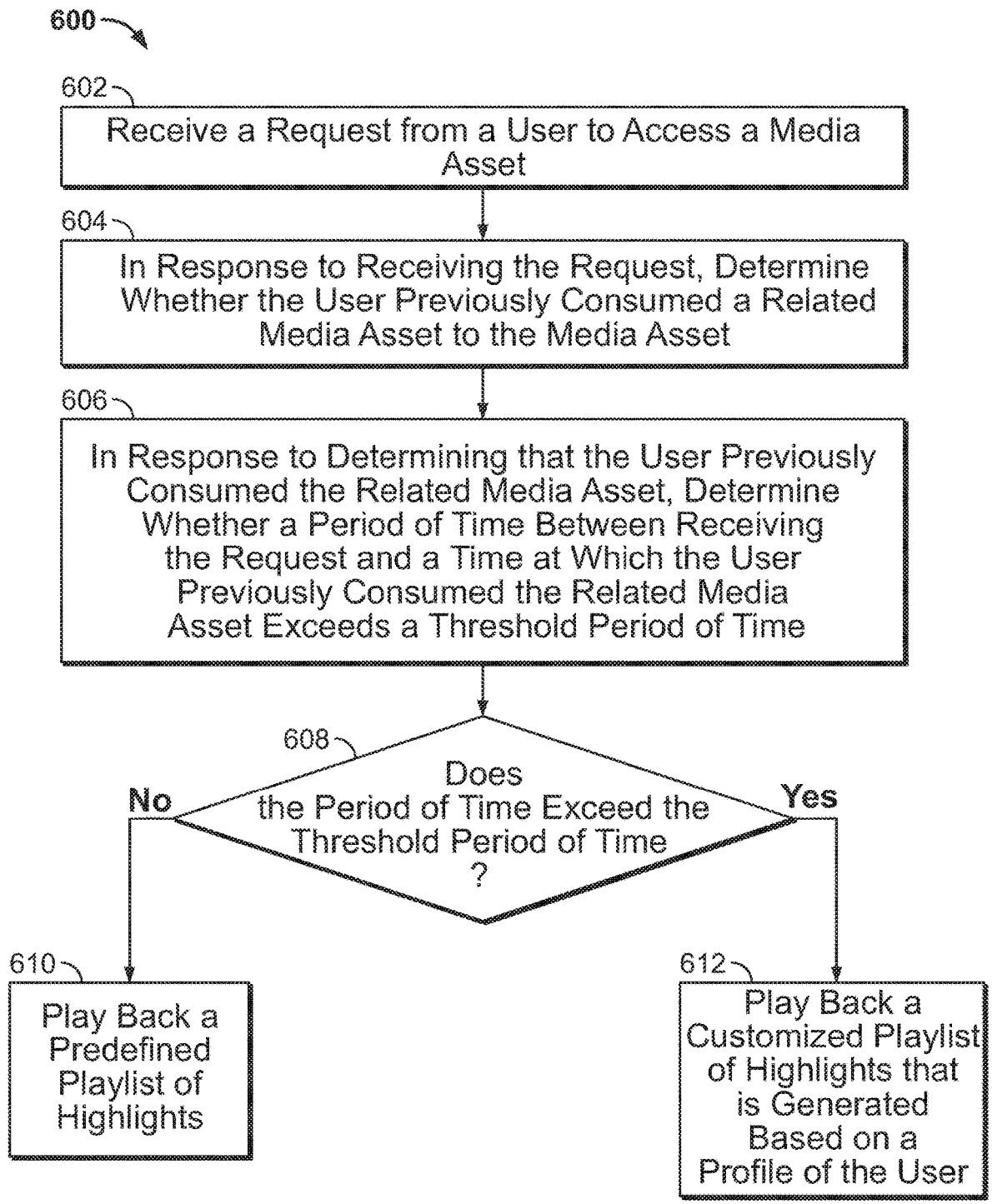
FIG. 6 depicts an illustrative flowchart of a process for determining whether to play back either a predefined playlist of highlights or a customized playlist of highlights, in accordance with some embodiments of the disclosure.

FIG. 6 depicts an illustrative flowchart of a process for determining whether to play back either a predefined playlist of highlights or a customized playlist of highlights, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514.

Process 600 begins at 602, where control circuitry 404 receives a request from a user to access a media asset. For example, control circuitry 404 may receive user input by way of user input interface 410. At 604, control circuitry 404 determines, in response to receiving the request, whether the user previously consumed a related media asset to the media asset. Control circuitry 404 determines whether the user previously consumed a related media asset in the same manner described above with respect to FIG. 1. Control circuitry 404 uses information from media guidance data source 518 to determine whether the user previously consumed the related media asset.

At 606, control circuitry 404 determines, in response to determining that the user previously consumed the related media asset, whether a period of time between receiving the request and a time at which the user previously consumed the related media asset exceeds a threshold period of time. Control circuitry 404 determines the period of time by using communications network 512 to retrieve period of time information found in media guidance data source 518. At 608, control circuitry 404 determines whether the period of time exceeds the threshold period of time. For example, control circuitry 404 may determine from user profile data from media guidance data source 518 the period of time between the request and when the user last consumed the related media asset. Control circuitry 404 may then determine, using processing circuitry 406, if the period of time exceeds the threshold period of time.

If, at 608, control circuitry 404 determines that "No," the period of time does not exceed the threshold period of time, then process 608 proceeds to 610. At 610, control circuitry 404 plays back a predefined playlist of highlights. For example, control circuitry 404 may play back a predefined playlist of highlights using display 412 and/or speakers 414.

If, at 608, control circuitry 404 determines that "Yes," the period of time exceeds the threshold period of time, then process 608 proceeds to 612. At 612, control circuitry 404 plays back a customized playlist of highlights that is generated by control circuitry 404 based on a profile of the user. For example, control circuitry 404 may play back a customized playlist of highlights using display 412 and speakers 414.

Figure 7:
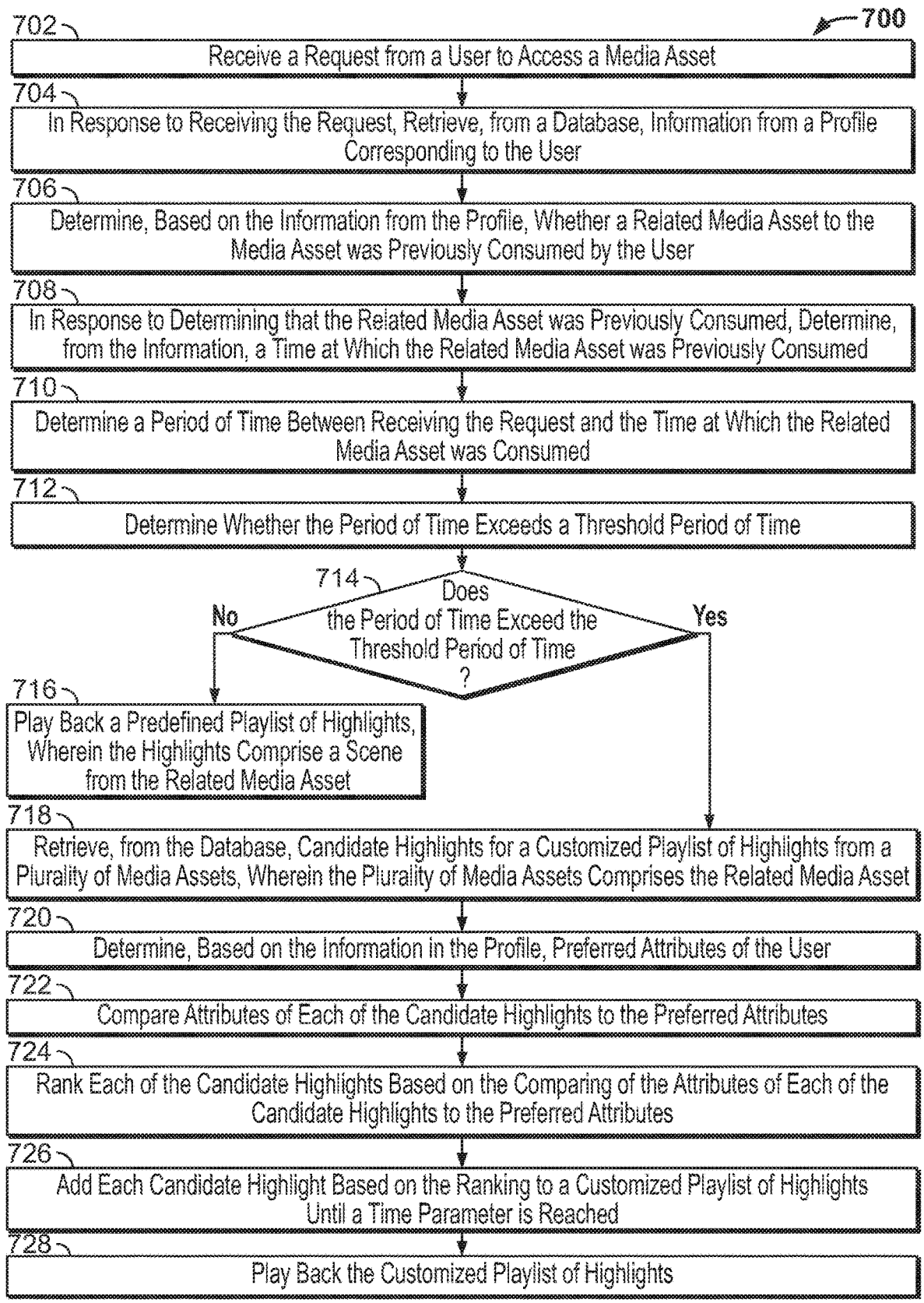
FIG. 7 depicts an illustrative flowchart of a process for determining whether to play back either a predefined playlist of highlights or generate and play back a customized playlist of highlights, in accordance with some embodiments of the disclosure.

FIG. 7 depicts an illustrative flowchart of a process for determining whether to play back either a predefined playlist of highlights or generate and play back a customized playlist of highlights, in accordance with some embodiments of the disclosure. Process 700 begins at 702, where control circuitry 404 receives a request from a user to access a media asset. For example, control circuitry 404 may receive user input by way of user input interface 410. At 704, in response to receiving the request, control circuitry 404 retrieves, from a database, information from a profile corresponding to the user. For example, control circuitry 404 may retrieve from media guidance data source 518 information from the user profile.

At 706, control circuitry 404 may determine, based on the information from the profile, whether a related media asset to the media asset was previously consumed by the user. Control circuitry 404 determines whether the user previously consumed a related media asset in the same manner described above with respect to FIG. 1. At 708, in response to determining that the related media asset was previously consumed, control circuitry 404 determines, from the information, a time at which the media asset was previously consumed. For example, control circuitry 404 may determine from the user's viewing history data retrieved from media guidance data source 518, the time at which the user consumed the related media asset.

At 710, control circuitry 404 determines a period of time between receiving the request and the time at which the related media asset was consumed. At 712, control circuitry determines whether the period of time exceeds a threshold period of time. Control circuitry 404 may determine, using processing circuitry 406, if the period of time exceeds the threshold period of time.

If, at 712, control circuitry 404 determines that "No," the period of time does not exceed the threshold period of time, then process 712 proceeds to 716. At 716, control circuitry 404 plays back a predefined playlist of highlights, where the highlights comprise a scene from the related media asset. For example, control circuitry 404 may play back a predefined playlist of highlights using display 412 and speakers 414.

If, at 712, control circuitry determines that "Yes," the period of time exceeds the threshold period of time, then process 712 proceeds to 718. At 718, control circuitry 404 retrieves, from the database, candidate highlights for a customized playlist of highlights from a plurality of media assets, where the plurality of media assets comprises the related media asset. For example, control circuitry 404 may retrieve candidate highlights from media content source 516 and information about the candidate highlights from media content source 516.

At 720, control circuitry 404 may determine, based on the information in the profile, preferred attributes of the user. For example, control circuitry 404 may determine based on user preference data from media guidance data source 518 the preferred attributes of the user. Control circuitry 404 determines the preferred attributes of the user in the same manner described above with respect to FIG. 1. At 722, control circuitry 404 compares attributes of each of the candidate highlights to the preferred attributes. For example, control circuitry 404 may compare the attributes of the candidate highlights, which may be found media guidance data source 518, to the preferred attributes. At 724, control circuitry 404 ranks each of the candidate highlights based on comparing the attributes of each of the candidate highlights to the preferred attributes. Control circuitry 404 ranks the candidate highlights in the same manner described above with respect to FIG. 1. At 726, control circuitry 404 adds each candidate highlight based on the ranking to a customized playlist of highlights until a time parameter is reached. For example, control circuitry 404 may use processing circuitry 406 to rank the candidate highlights and add each ranked candidate highlight to a customized playlist of highlights until a time parameter is reached. The time parameter may be retrieved from media guidance data source 518.

At 728, control circuitry 404 plays back the customized playlist of highlights. For example, control circuitry 404 may play back the customized playlist of highlights using display 412 and speakers 414.

Figure 8:
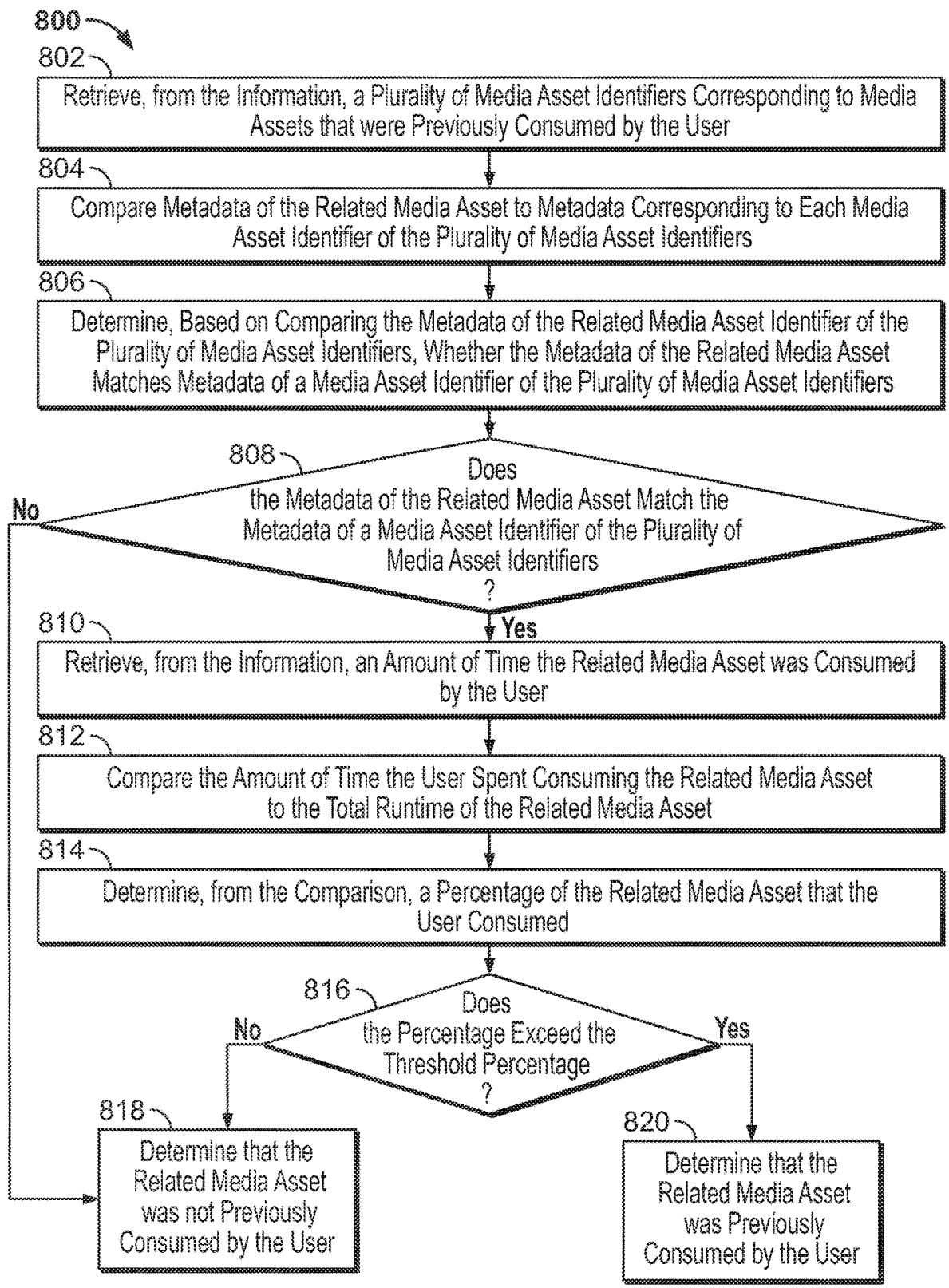
FIG. 8 depicts an illustrative flowchart of a process for determining if the user previously consumed a related media asset, in accordance with some embodiments of the disclosure.

FIG. 8 depicts an illustrative flowchart of a process for determining if the user previously consumed a related media asset, in accordance with some embodiments of the disclosure. Process 800 begins at 802, where control circuitry 404 retrieves, from the information, a plurality of media asset identifiers corresponding to media assets that were previously consumed by the user. Control circuitry 404 may retrieve the media asset identifiers from media guidance data source 518. At 804, control circuitry 404 compares the metadata of the related media asset to metadata corresponding to each media asset identifier of a plurality of media asset identifies. For example, control circuitry 404 may compare the metadata found in media guidance data source 518 using processing circuitry 406.

At 806, control circuitry 404 determines, based on comparing the metadata of the related media asset identifier of the plurality of media asset identifiers, whether the metadata of the related media asset matches metadata of a media asset identifier of the plurality of media asset identifiers. At 808, control circuitry 404 determines whether the metadata of the related media asset matches the metadata of a media asset identifier of the plurality of media asset identifiers. For example, control circuitry 404 may compare the metadata of the related media asset identifier, "episode title," to the metadata of the media asset identifiers that were previously consumed by the user.

If, at 808, control circuitry determines that "No," the metadata of the related media asset does not match the metadata of a media asset identifier of the plurality of media asset identifiers, then process 808 proceeds to 818.

If, at 808, control circuitry determines that "Yes," the metadata of the related media asset does match the metadata of a media asset identifier of the plurality of media asset identifiers, then process 808 proceeds to 810. At 810, control circuitry 404 retrieves, from the information, an amount of time the related media asset was consumed by the user. For example, control circuitry 404 may retrieve the amount of time the related media asset was consumed by the user from the user viewing history data found in media guidance data source 518. At 812, control circuitry 404 compares the amount of time the user spent consuming the related media asset to the total runtime of the media asset. The total runtime of the related media asset may be found in the information in media guidance data source 518. At 814, control circuitry 404 determines, from the comparison, a percentage of the related media asset that the user consumed. At 816, control circuitry 404 determines whether the percentage exceeds a threshold percentage.

If, at 816, control circuitry determines that "No," the percentage does not exceed the threshold percentage, then process 808 proceeds to 818. At 818, control circuitry 404 determines that the related media asset was not previously consumed by the user.

If, at 816, control circuitry 404 determines that "Yes" the percentage exceeds the threshold, then process 816 proceeds to 820. At 820, control circuitry 404 determines that the related media asset was previously consumed by the user.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   receiving a request to access a first media asset, wherein the request is associated with a user profile;
   determining whether the user profile indicates previous consumption of a second media asset that is related to the first media asset by:
      identifying a particular genre of the second media asset;
      identifying, based on the identified particular genre of the second media asset, a threshold ratio for the particular genre from among a plurality of different threshold ratios respectively corresponding to a plurality of different genres, wherein the threshold ratio for the particular genre is used to determine whether the second media asset, corresponding to the particular genre, was consumed in association with the user profile;
      determining a ratio of an amount of time of the previous consumption of the second media asset to a total runtime of the second media asset; and
      determining that the ratio exceeds the threshold ratio for the particular genre;
   in response to the determining that the ratio exceeds the threshold ratio for the particular genre, determining that the second media asset was consumed in association with the user profile;
   determining that a period of time between receiving the request and a time of the previous consumption of the second media asset exceeds a threshold period of time; and
   in response to determining that the period of time exceeds the threshold period of time, causing a customized playlist of highlights, generated based on the user profile, to be played.

2. The method of claim 1, further comprising:
   in response to determining that the period of time does not exceed the threshold period of time, causing a predefined playlist of highlights to be played.

3. The method of claim 1, wherein:
the particular genre is a first genre that is associated with the threshold ratio for the first genre,
the threshold ratio for the first genre is greater than a threshold ratio associated with a second genre of the plurality of different genres.

4. The method of claim 1, wherein identifying the threshold ratio for the particular genre further comprises:
identifying a particular episodic series that the second media asset is part of.

5. The method of claim 1, wherein determining the ratio of the amount of time of the previous consumption of the second media asset to the total runtime of the second media asset comprises:
determining one or more portions of the second media asset that were consumed;
determining, for each respective portion, a particular ratio of an amount of time of the previous consumption of the respective portion to a total runtime of the respective portion; and
determining the ratio of the amount of time of the previous consumption of the second media asset to the total runtime of the second media asset based on the determined particular ratio for each respective portion.

6. The method of claim 1, wherein causing the customized playlist of highlights, generated based on the user profile, to be played comprises:
identifying a plurality of candidate-predefined playlists;
determining preferred attributes indicated by the user profile;
comparing attributes of each of the candidate-predefined playlists to the preferred attributes; and
selecting the customized playlist of highlights based on the comparing.

7. The method of claim 1, further comprising:
receiving user input to modify the threshold ratio for the identified particular genre of the second media asset; and
updating the threshold ratio for the identified particular genre of the second media asset based on the received user input.

8. The method of claim 1, wherein identifying the genre of the second media asset is performed based on metadata of the second media asset.

9. The method of claim 1, further comprising:
determining a chronological data set of times at which each of a plurality of media assets related to the media asset was previously consumed, wherein the plurality of media assets related to the media asset comprises the second media asset;
determining, from the data set of times, an interval of time between two consecutive time data points in the data set of times;
determining whether the interval of time exceeds a threshold interval of time during which the user did not consume related media content; and
in response to determining that the interval of time exceeds the threshold interval of time, selecting, for inclusion in the customized playlist of highlights, highlights from a related media asset consumed directly before the interval in time.

10. The method of claim 5, wherein determining the ratio of the amount of time of the previous consumption of the second media asset to the total runtime of the second media asset further comprises:
computing an average based on the respective particular ratios of consumption for the one or more respective portions; and
determining the ratio of the amount of time of the previous consumption of the second media asset to the total runtime of the second media asset based on the computed average.

11. A system comprising:
memory;
control circuitry configured to:
receive a request to access a first media asset, wherein the request is associated with a user profile;
determine whether the user profile indicates previous consumption of a second media asset that is related to the first media asset by:
identifying a particular genre of the second media asset;
determining, based on the identified genre of the second media asset, a threshold ratio for the particular genre from among a plurality of different threshold ratios respectively corresponding to a plurality of different genres, wherein the threshold ratio for the particular genre is used to determine whether the second media asset, corresponding to the particular genre, was consumed in association with the user profile;
determining a ratio of an amount of time of the previous consumption of the second media asset to a total runtime of the second media asset; and
determining that the ratio exceeds the threshold ratio for the particular genre;
in response to the determining the ratio exceeds the threshold ratio for the particular genre, determine that the second media asset was consumed in association with the user profile;
determine that a period of time between receiving the request and a time of the previous consumption of the second media asset exceeds a threshold period of time; and
in response to determining that the period of time exceeds the threshold period of time, cause a customized playlist of highlights, generated based on the user profile, to be played.

12. The system of claim 11, wherein the control circuitry is further configured to:
in response to determining that the period of time does not exceed the threshold period of time, cause a predefined playlist of highlights to be played.

13. The system of claim 11, wherein:
the particular genre is a first genre that is associated with the threshold ratio for the first genre,
the threshold ratio for the first genre is greater than a threshold ratio associated with a second genre of the plurality of different genres.

14. The system of claim 11, wherein the control circuitry is further configured to identify the threshold ratio for the particular genre by:
identifying a particular episodic series that the second media asset is part of.

15. The system of claim 11, wherein the control circuitry is configured to determine the ratio of the amount of time of the previous consumption of the second media asset to the total runtime of the second media asset by:
determining one or more portions of the second media asset that were consumed;

determining, for each respective portion, a particular ratio of an amount of time of the previous consumption of the respective portion to a total runtime of the respective portion; and determining the ratio of the amount of time of the previous consumption of the second media asset to the total runtime of the second media asset based on the determined particular ratio for each respective portion.

16. The system of claim 11, wherein the control circuitry is configured to cause the customized playlist of highlights, generated based on the user profile, to be played by:

identifying a plurality of candidate-predefined playlists;

determining preferred attributes indicated by the user profile;

comparing attributes of each of the candidate-predefined playlists to the preferred attributes; and selecting the customized playlist of highlights based on the comparing.

17. The system of claim 11, wherein the control circuitry is further configured to:

receive user input to modify the threshold ratio for the identified particular genre of the second media asset; and update the threshold ratio for the identified particular genre of the second media asset based on the received user input.

18. The system of claim 11, wherein the control circuitry is configured to identify the genre of the second media asset based on metadata of the second media asset.

19. The system of claim 11, wherein the control circuitry is further configured to:

determine a chronological data set of times at which each of a plurality of media assets related to the media asset was previously consumed, wherein the plurality of media assets related to the media asset comprises the second media asset;

determine, from the data set of times, an interval of time between two consecutive time data points in the data set of times;

determine whether the interval of time exceeds a threshold interval of time during which the user did not consume related media content; and in response to determining that the interval of time exceeds the threshold interval of time, select, for inclusion in the customized playlist of highlights, highlights from a related media asset consumed directly before the interval in time.

20. The system of claim 15, wherein the control circuitry is further configured to determine the ratio of the amount of time of the previous consumption of the second media asset to the total runtime of the second media asset by:

computing an average based on the respective particular ratios of consumption for the one or more respective portions; and determining the ratio of the amount of time of the previous consumption of the second media asset to the total runtime of the second media asset based on the computed average.

* * * * *